US010447358B2

(12) United States Patent
Vu

(10) Patent No.: US 10,447,358 B2
(45) Date of Patent: Oct. 15, 2019

(54) SYSTEM, METHOD AND APPARATUS FOR MULTI-INPUT MULTI-OUTPUT COMMUNICATIONS OVER PER-TRANSMITTER POWER-CONSTRAINED CHANNELS

(71) Applicant: Trustees of Tufts College, Medford, MA (US)

(72) Inventor: Mai Vu, Belmont, MA (US)

(73) Assignee: Trustees of Tufts College, Medford, MA (US)

( * ) Notice: Subject to any disclaimer, the term of this patent is extended or adjusted under 35 U.S.C. 154(b) by 0 days.

(21) Appl. No.: 15/617,361

(22) Filed: Jun. 8, 2017

(65) Prior Publication Data

US 2018/0091199 A1 Mar. 29, 2018

Related U.S. Application Data

(63) Continuation of application No. 15/333,159, filed on Oct. 24, 2016, now abandoned, which is a continuation of application No. 13/910,093, filed on Jun. 4, 2013, now Pat. No. 9,503,170.

(60) Provisional application No. 61/830,328, filed on Jun. 3, 2013, provisional application No. 61/655,011, filed on Jun. 4, 2012.

(51) Int. Cl.
| H04B 7/04 | (2017.01) |
| H04L 25/03 | (2006.01) |
| H04B 7/0456 | (2017.01) |
| H04B 7/0426 | (2017.01) |

(52) U.S. Cl.
CPC ....... *H04B 7/0465* (2013.01); *H04L 25/0391* (2013.01); *H04B 7/043* (2013.01); *H04B 7/0426* (2013.01); *H04B 7/0456* (2013.01)

(58) Field of Classification Search
CPC .... H04B 7/0465; H04B 7/0426; H04B 7/043; H04B 7/0456; H04L 25/0391
See application file for complete search history.

(56) References Cited

U.S. PATENT DOCUMENTS

| 6,101,399 | A | 8/2000 | Raleigh et al. |
| 6,185,258 | B1 | 2/2001 | Alamouti et al. |
| 6,721,374 | B2 | 4/2004 | Piirainen |
| 6,873,651 | B2 | 3/2005 | Tesfai et al. |
| 7,076,263 | B2 | 7/2006 | Medvedev et al. |
| 7,099,678 | B2 | 8/2006 | Vaidyanathan |
| 7,133,459 | B2 | 11/2006 | Onggosanusi et al. |
| 7,158,493 | B1 | 1/2007 | Uhlik et al. |
| 7,194,237 | B2 | 3/2007 | Sugar et al. |
| 7,206,354 | B2 | 4/2007 | Wallace et al. |

(Continued)

OTHER PUBLICATIONS

Boccardi et al., "Optimum power allocation for the MIMO-8C zero-forcing precoder with per-antenna power constraints", 2006, IEEE, p. 504.

(Continued)

*Primary Examiner* — Sophia Vlahos
(74) *Attorney, Agent, or Firm* — Occhiuti & Rohlicek LLP

(57) ABSTRACT

A multipath communication system forms a complex weighted compound signal for transmission through a channel environment wherein the compound signal includes a complex variable weighted compound signal related to a count of available antennas, a power constraint related to each said antenna, and a channel state characteristic.

10 Claims, 17 Drawing Sheets

(56) References Cited

U.S. PATENT DOCUMENTS

| | | | |
|---|---|---|---|
| 7,237,115 B1 | 6/2007 | Thomas et al. | |
| 7,269,436 B2 | 9/2007 | Won | |
| 7,295,636 B2 | 11/2007 | Onggosanusi et al. | |
| 7,298,717 B2 | 11/2007 | Hui et al. | |
| 7,672,389 B2 | 3/2010 | Gueguen | |
| 7,680,212 B2 | 3/2010 | Vu et al. | |
| 7,889,805 B2 | 2/2011 | Kim et al. | |
| 8,014,265 B2 | 9/2011 | Sarkar et al. | |
| 8,213,533 B2 | 7/2012 | Hafeez | |
| 8,374,155 B2 | 2/2013 | Koo et al. | |
| 8,385,861 B2 | 2/2013 | Ohwatari et al. | |
| 8,483,310 B2 | 7/2013 | Coldrey et al. | |
| 8,917,787 B2 | 12/2014 | Gaur | |
| 9,503,170 B2 | 11/2016 | Vu | |
| 2010/0272211 A1* | 10/2010 | Ohwatari | H04B 7/0426 375/295 |
| 2011/0002414 A1* | 1/2011 | Coldrey | H04B 7/0426 375/296 |

OTHER PUBLICATIONS

T. Cover and J. Thomas, Elements of Information Theory, 2nd ed. John Wiley & Sons, Inc., 2006.
I. Telatar, "Capacity of multi-antenna Gaussian channels," European Transactions on Telecommunications, vol. 10, No. 6, pp. 585-595, Nov. 1999.
W. Yu, W. Rhee, S. Boyd, and J. Cioffi, "Iterative water-filling for Gaussian vector multiple-access channels," Information Theory, IEEE Transactions on, vol. 50, No. 1, pp. 145-152, 2004.
W. Yu and T. Lan, "Transmitter optimization for the multi-antenna downlink with per-antenna power constraints," IEEE Transactions on Signal Processing, vol. 55, No. 6, pp. 2646-2660, Jun. 2007.
M. Codreanu, A. Tolli, M. Juntti, and M. Latva-Aho, "MIMO downlink weighted sum rate maximization with power constraints per antenna groups," in IEEE VTC Spring, 2007, pp. 2048-2052.
S. Shi, M. Schubert, and H. Boche, "Per-antenna power constrained rate optimization for multiuser MIMO systems," in International ITG Workshop on Smart Antennas (WSA), 2008, pp. 270-277.
J. Yang and D. K. Kim, "Multi-cell uplink-downlink beamforming throughput duality based on lagrangian duality with per-base station power constraints," Communications Letters, IEEE, vol. 12, No. 4, pp. 277-279, 2008.
M. Vu, "MISO Capacity with Per-Antenna Power Constraint," IEEE Transactions on Communications, May 2011.
R. Zhang, "Cooperative multi-cell block diagonalization with per-base-station power constraints," Selected Areas in Communications, IEEE Journal on, vol. 28, No. 9, pp. 1435-1445, 2010.
Hao Zou, Aakanksha Chowdhery, John M. Cioffi.; A Centralized Multi-Level Water-Filling Algorithm for Dynamic Spectrum Management; IEEE Conference Publications; Signals, Systems and Computers, 2009 Conference Record of the Forty-Third Asilomar Conference on Nov. 1-4, 2009; Pacific Grove, CA; pp. 1101-1105.
Xia Liu and Marek E. Bialkowski, "Optimization of Training Signal Transmission for Estimating MIMO Channel under Antenna Mutual Coupling Conditions," International Journal of Antennas and Propagation, vol. 2010, Article ID 213576, 10 pages, 2010.
File History for U.S. Appl. No. 13/910,093.
File History for U.S. Appl. No. 61/655,011.
File History for U.S. Appl. No. 61/830,328.

* cited by examiner

Capacities of a 2 x 2 channel with perfect CSIT at SNR = 0dB with $P = \text{diag}\{P_1, 1 - P_1\}$ Convergence comparison for a 3 × 3 channel at SNR = −5dB, $\varepsilon = 10^{-6}$ and random starting point $\check{D}_0$ Convergence statistics based on 1000 independent realizations for each channel size, SNR = -5dB, $\epsilon = 10^{-6}$ (left: our proposed algorithm; right: comparison with the algorithm in [9]).

| number of receive antennas m | 2 | 3 | 4 | 6 | 8 | 10 |
|---|---|---|---|---|---|---|
| non-convergence cases for n = m | 72 | 124 | 95 | 587 | 961 | 1000 |
| non-convergence cases for n = 2m | 504 | 523 | 647 | 739 | 877 | 933 |

TABLE I

NUMBER OF NON-CONVERGENT CASES (OUT OF 1000) FOR THE ALGORITHM IN [9].

FIG. 14

SYSTEM, METHOD AND APPARATUS FOR MULTI-INPUT MULTI-OUTPUT COMMUNICATIONS OVER PER-TRANSMITTER POWER-CONSTRAINED CHANNELS

CROSS-REFERENCE TO RELATED APPLICATIONS

The present application is a continuation of U.S. patent application Ser. No. 15/333,159 filed Oct. 24, 2016 (now abandoned), which is a continuation of U.S. patent application Ser. No. 13/910,093 filed on Jun. 4, 2013 (now issued as letters U.S. Pat. No. 9,503,170) which claims the benefit of U.S. provisional patent application No. 61/655,011 filed on Jun. 4, 2012, and of U.S. provisional patent application No. 61/830,328 filed on Jun. 3, 2013, the disclosures of which is herewith incorporated by reference in their entireties. Where mathematical or other notation is in conflict between the present disclosure and the provisional patent applications and/or between and among the same, the provisional applications shall be considered authoritative with the '328 application being considered to supersede the '011 application.

FIELD OF THE INVENTION

The present invention relates to the data communications, and more particularly to multipath data communications.

SUMMARY

Having examined and understood a range of previously available devices, the inventor of the present invention has developed a new and important understanding of the problems associated with the prior art and, out of this novel understanding, has developed new and useful solutions and improved devices, including solutions and devices yielding surprising and beneficial results. The invention encompassing these new and useful solutions and improved devices is described below in its various aspects with reference to several exemplary embodiments including a preferred embodiment.

The principal advantage of a MIMO system is that it allows the concurrent transmission of local data streams so as to increase the robustness and effective data rate of a system as a whole. A variety of approaches are used to effect this concurrent transmission including the transmission of orthogonal signals and the transmission of data signals over spatially distinct paths. In a radio frequency wireless implementation, MIMO communications is typically effected by transmitting signals concurrently from several antennas of an array. Reception often includes receiving the concurrently transmitted signals at a receiving array, where the receiving array also includes several antennas.

The present invention relates to improving communications in a multipath communications system, and more particularly in a multi-input-multi-output (MIMO) communications system. In particular, the present invention provides communications in a multi-input multi-output (MIMO) communications system where transmission power is constrained on a per-transmitter basis.

Generally speaking, power is distributed to the antennas of an array according to a "water-filling algorithm" which allocates power on the basis of the eigenmodes of a particular multipath channel, and considering only a total power constraint among all the transmitters. Under such an approach, power is allocated to individual transmitter devices of a transmitter array according to the requirements of a desired radiation pattern, and assuming a capacity of each individual transmitter device to handle the corresponding power requirements. This is recognized as an approximate approach based on idealization of the transmitter devices, and there has been a long felt need among practitioners of in the art for an improved approach. This long felt need has remained unsatisfied, however, in the face of technical challenges, which are now over, the present invention.

The inventor has come to understand, however, that by applying the invention disclosed herewith, it is possible to identify a maximum average power constraint for each antenna of a plurality of transmit antennas. Thereafter, it is possible to provide power on a practical basis that approaches and/or is substantially equivalent to that value with highly beneficial results. This is especially true where, as in the present invention, an appropriate application of complex weighting values to incoming various signal components results in a dynamically adjustable optimal spatial distribution of transmit power. In effect, under certain embodiments of the present invention, customized power is applied to each of a plurality of antennas according to a per-antenna power constrained, and the total power output is steered into one or more beams on an optimized dynamic basis, based on the more or less instantaneous characteristics of the channel (including short term and long term statistics of the channel).

Accordingly, under the present invention, there is no assumption of power handling capacity implicit in the signal allocation process as to the characteristics of signals that individual transmitter devices are to produce. That is, there is not necessarily a single power budget to be shared among a finite array of antennas. Rather, information is acquired as to the actual power handling capacity (and, where appropriate, any other relevant characteristics) of a particular transmitter device. Signal allocation is optimized according to the actual capabilities of each transmitter device. In this way, beam formation, signal transmission redundancy, and data rate improvements are achieved.

Of further interest is the fact that, in exemplary embodiments of the invention, either or both of the transmitting and receiving antenna arrays are readily reconfigurable. Indeed, where an appropriate standard is established for communicating identity and antenna power constraints an array can be formed on a dynamic ad hoc basis such that otherwise unrelated antennas can be configured as a spatially extensive array where the ownership and control of the individual antennas may be diverse. Thus, for example, a large number of individual transmitter devices including, for example, transmitter devices associated with discrete cellular telephones, personal digital assistants, laptop computers, desktop computers, wireless routers, base stations, relay base stations, femtocells, WiFi access points etc., can be manually or automatically configured to operate as an ad hoc communication antenna array of large spatial extent based on prior implicit or explicit agreements and authorization to participate supplied by the respective users on the individual devices. Because it is readily configured to receive and adapt to the power constraints of each communication antenna, along with its respective modulation and amplification apparatus, a communication system according to principles of the present invention is uniquely capable of developing and employing this and other novel antenna arrangements.

In light of the resident disclosure, one of skill in the art will immediately recognize the remarkable and surprising advantages of such an ad hoc antenna array. Because the characteristics of the individual transmitter device are available and accounted for, transmitters of varying characteristics can be employed together.

Moreover, the transmitters that happen to be available within a particular spatial environment can provide capacity that would otherwise be unavailable. Thus, for example, a large number of communications units such as cellular telephones, personal digital assistant devices, laptop computers, desktop computers, wireless routers, televisions, radios, walkie-talkies, and other apparatus that include transmitter devices will be present in a typical office building. In light of the present invention, one of skill in the art will appreciate that a sharing protocol can be established whereby individual communications units can self identify, or be detected, as present within an operative spatial region (i.e. a spatial region within which communication units are capable of cooperating or allowed to cooperate).

Depending on the specifics of a particular protocol, this self identification will allow a transmitter to acquire the relevant characteristic information for any appropriate number of the available communication units. On the basis of this characteristic information, a respective properly weighted composite signal will be conveyed from the transmitter to each communication unit. Each such communication unit, on receiving the respective composite signal will transmit that signal at an operative power level optimized (and in most cases maximized) according to the characteristics of the individual transmitter device so as to achieve the highest possible data rate.

This approach provides the transmitter with immediate access to the power resources of a large number of communication units. At the same time, the transmitter is not limited by the power constraints of any particular one of the large number of communication units. Rather, the power demands made on any communication unit are moderated by the known value of that unit's transmitter power constraint.

Moreover, the individual transmitter devices are potentially distributed over spatial area that will be vast by comparison to the size of a typical conventional transmitter. Thus, for example, a single cell phone may have effective access to an ad hoc transmission array capable of transmitting at power levels many orders of magnitude above the transmission power available to the cell phone, and from an array of antennas is likewise many orders of magnitude larger than the cell phone itself.

Moreover, depending on the communication and synchronization capabilities of the individual communication units, it will be possible to form an ad hoc communication array that includes an extended network of communication units where information is passed on peer-to-peer, or other, basis between communication units. In this way, signals can be conveyed from the transmitter to an individual communication unit that is beyond the direct communications range of any transmitter device within the transmitter itself.

In particular limitations of the invention, individual communication units will join and depart from the ad hoc array on a stochastic basis, according to the movements of various individuals who may control those communication units, and according to the other requirements placed on those units. According to various embodiments, these joining and departing activities, along with the requisite calculations and reallocation of signal content will be handled on an automatic basis according to a pre-agreed protocol. It will be understood that a wide variety of such protocols and arrangements, including any requisite software and hardware, will fall within the scope of the present invention as conceived and disclosed here.

Naturally, it will be appreciated that while the discussion above relates to a transmitter, a symmetrical arrangement can be employed with respect to a receiver. In addition, it will be understood by one of skill in the art, that the present invention is not limited to cell phones or any other personal communication unit, but will also have applications in their wide variety of other communications fields. Indeed, principles of the invention will readily be applied in such diverse fields as, for example, optical and radio astronomy, acoustical event monitoring, undersea communications and imaging, inventory tracking, optical waveguides, such as optical fibers, a digital subscriber line (DSL) communication system or other wired communication system and other fields equally diverse in nature and complexity.

One of skill in the art will thus understand that the present invention offers the opportunity to maximize the consolidated information transmission rate subject to individual power constraints applied on a per-antenna basis where, in the idealized situation of perfect Channel State Information at the Transmitter (CSIT) one may realize:

$$\max \log \det(I_m + HQH_\dagger)$$

$$\text{subject to } e_i^T Q e_i <= P_i, \ i=1 \ldots n$$

$$Q \succ = 0$$

where $e_i^T Q e_i <= P_i$, with $ei=[0 \ldots 1 \ldots 0]T$ as a vector with the $i_{th}$ element equal to 1 and the rest are 0, refers to the power constraint at the ith antenna and Q is Hermitian.

By way of notational convention, throughout this disclosure, matrices will be presented in bold font and the presence of an inverted hat over a matrix variable, e.g., "Ĥ" will identify the inverse or pseudo-inverse of the corresponding matrix "H."

The specification and drawings are to be considered along with the claims, but only for purposes of enabling proper construction of the claims. As such, the figures provided herewith should in no way be considered limiting. Nor should any one figure necessarily be deemed to encompass every aspect of any particular embodiment of the invention. Rather, the figures should be considered together to show various aspects of the invention in its varied embodiments including a preferred embodiment. Accordingly, the various attached figures can be construed as various aspects, or views, of a particular embodiment of the invention. As such, it will be understood that the invention disclosed and defined herein extends to all alternative combinations of two or more of the individual features mentioned or evident from the drawings and/or text.

All of these different combinations constitute various alternative aspects of the invention. Any attempt to limit the invention, or any embodiment thereof, to those aspects presented in a particular figure or subset of figures would be contrary to the intention of the inventor and improperly limiting. Rather, the invention can be modified to incorporate any number of variations, alterations, substitutions, or equivalent arrangements not heretofore described, but which are commensurate with the spirit and scope of the invention. Accordingly, the invention is not to be seen as limited by the drawings, but is only limited by the scope of the appended claims.

BRIEF DESCRIPTION OF THE DRAWINGS

FIG. 14 shows, in tabular form, simulation results related to experimental simulation of a system and method for multipath communication of information according to principles of the invention.

DETAILED DESCRIPTION

The following description is provided to enable any person skilled in the art to make and use the disclosed inventions and sets forth the best modes presently contemplated by the inventors of carrying out their inventions. Having examined and understood a range of previously available devices, the inventor in the present invention has developed a new and important understanding of the problems associated with the prior art and, out of this novel understanding, has developed new and useful solutions and improved devices, including solutions and devices yielding surprising and beneficial results. The invention encompassing these new and useful solutions and improved devices is described below in its various aspects with reference to several exemplary embodiments including a preferred embodiment. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the substance disclosed.

Figure 1:
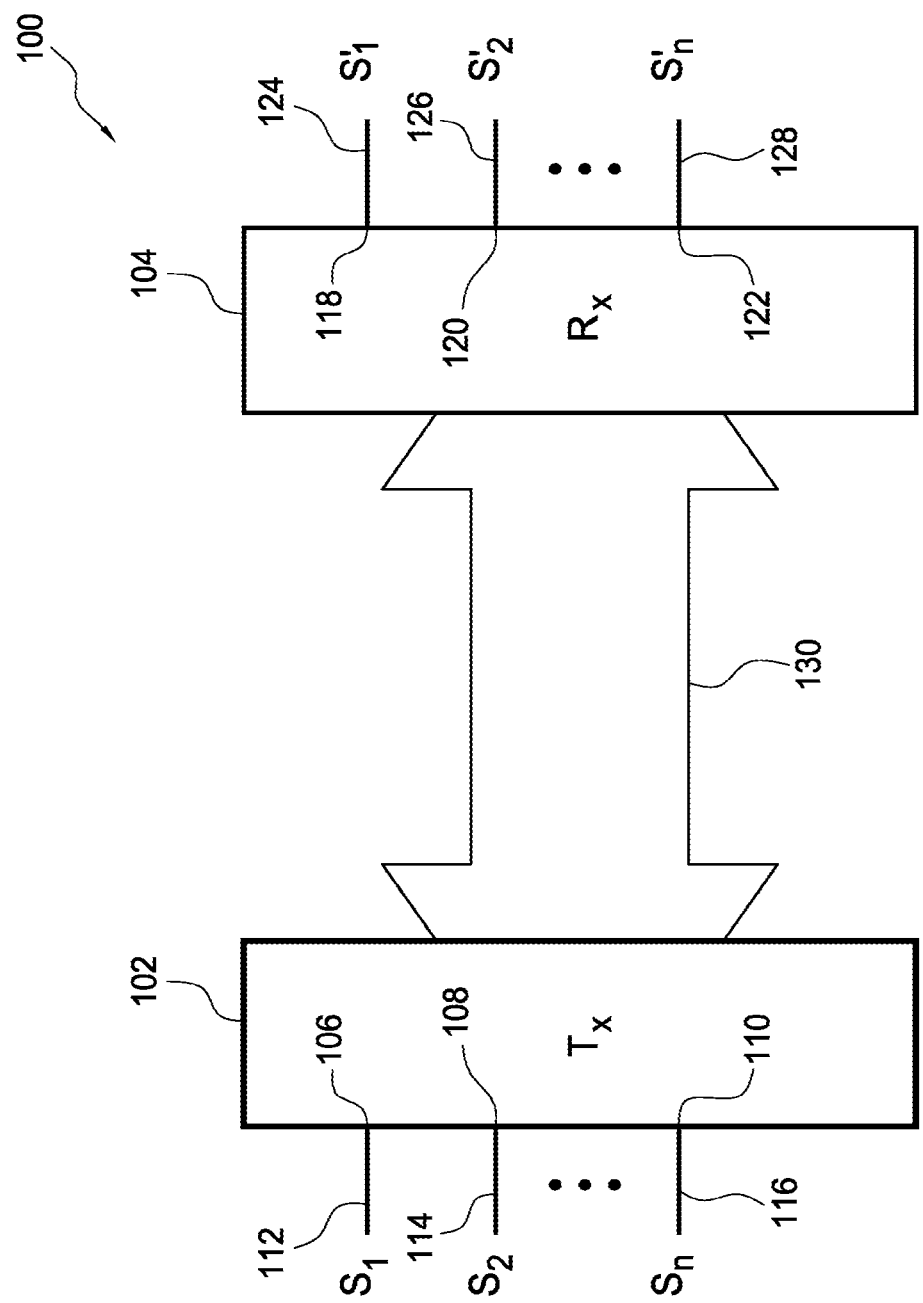
FIG. 1 shows, in schematic block diagram form, certain aspects of an exemplary system and apparatus for multipath communication of information according to principles of the invention.

FIG. 1 shows, in schematic block diagram form, a portion of an exemplary multipath wireless communication system 100. The illustrated multipath communication system includes a transmitter subsystem 102 and a receiver subsystem 104. The practitioner of ordinary skill will understand that this representation is made for simplicity, and that one or both of the transmitter subsystem 102 and the receiver subsystem 104 may be representative of respective transceiver subsystems.

The transmitter subsystem 102 includes a plurality of input nodes e.g., 106, 108, 110, configured to receive respective input signals 112, 114, 116. For purposes of this disclosure, input signals, e.g., 112, 114, 116 may be considered functionally independent of one another. The receiver subsystem 104 includes a plurality of output nodes e.g., 118, 120, 122, configured to produce respective output signals, e.g., 124, 126, 128. Output signals 124, 126, 128 are substantially related to input signals 112, 114, 116 respectively, typically according to an estimation relationship.

According to the present invention, information related to each of the input signals is transmitted from the transmitter 102 to the receiver 104 by way of a multipath communication channel 130. The transmitter 102 and receiver 104 will include any of a wide variety of transmitters and receivers for coupling to and from the multipath communication channel 130. In an exemplary arrangement, the multipath communication channel includes an evacuated region of space, and/or a region of space including one or more dielectric materials.

Correspondingly, the transmitter 102 includes, transmitting devices including a plurality of transmitting antennas and the receiver 104 includes a plurality of receiving devices including a plurality of receiving antennas. Each of the antennas will, in such an exemplary application, be configured for the free-space communication of radio frequency signals, microwave signals, extremely low frequency signals, or any other electromagnetic signal appropriate to a particular application. As will be further discussed below, according to principles of the invention, the various transmitters and receivers, and related equipment, need not be identical to one another in their physical or operational characteristics. Thus, for example, the maximum average power transmitted from a particular transmitting antenna need not be the same as the maximum average power transferred from another signal transmitting antenna of the same embodiment.

As an exemplary alternative, multipath communication channel 130 will include a plurality of optical waveguides, such as optical fibers. Corresponding coupling apparatus in such an embodiment may include optical emitters and detectors associated with the transmitter and receiver respectively. It will be understood that any reference throughout this disclosure to optical wavelengths will be intended to include one or more of visible and invisible spectrum wavelengths.

As a further exemplary alternative, multipath communication channel 130 will include a plurality of electrical conductors arranged, for example, as a digital subscriber line (DSL) communication system or other wired communication system. As a still further exemplary alternative, multipath communication channel 130 will include a plurality of acoustical emitters and acoustical detectors configured to couple respectively to an acoustically conductive medium. One of skill in the art will appreciate that the foregoing examples are merely illustrative of a wide variety of communications apparatus that may be employed alone or in combination to realize a multipath communication channel 130.

As will be further discussed below, according to principles of the invention, the characteristics of multipath communication channel 130, and those of the various coupling apparatus, are adaptable modeling and control for purposes of optimizing the transmission of information over the communication channel 130.

Figure 2:
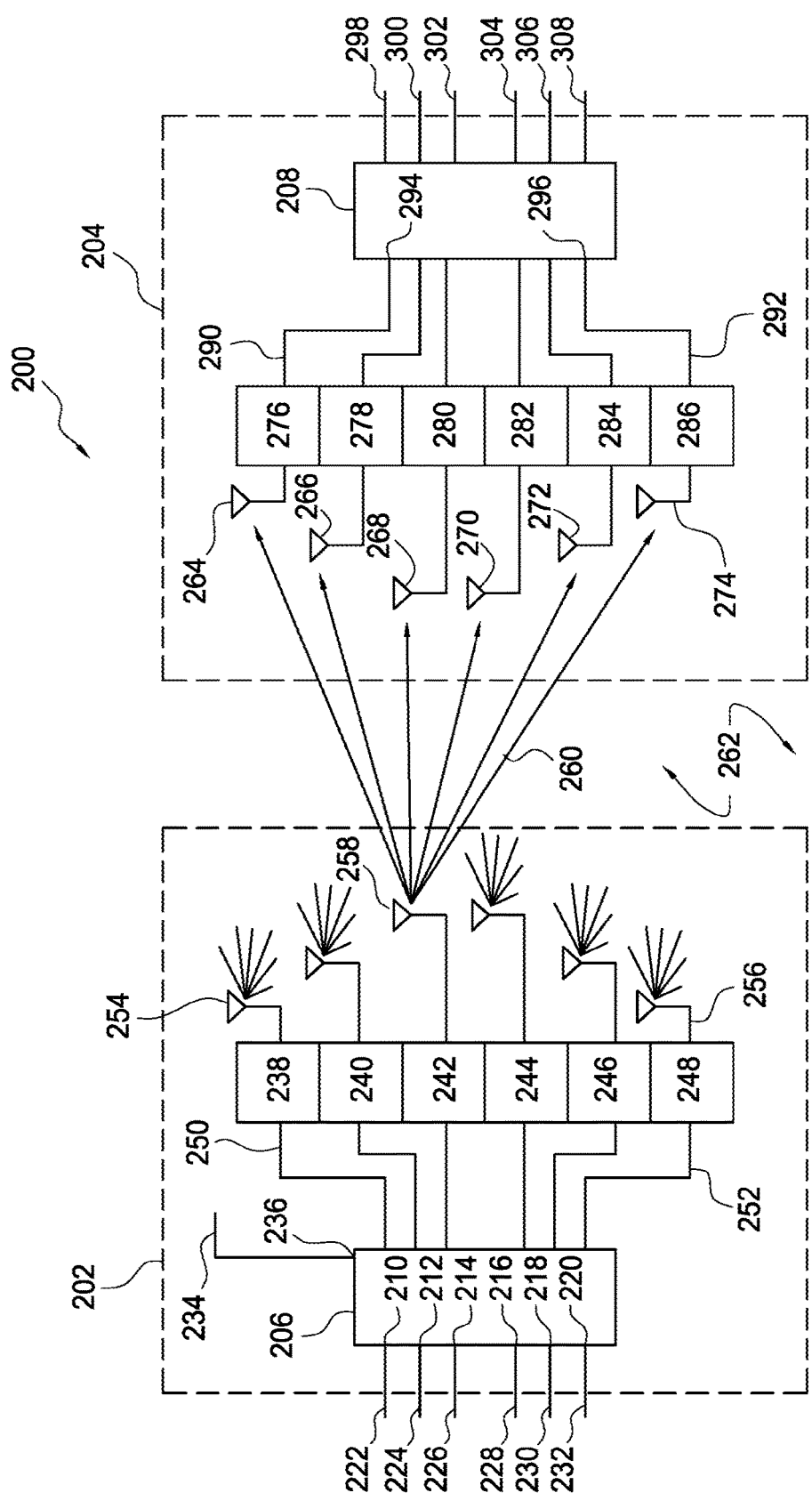
FIG. 2 shows, in schematic block diagram form, further aspects of an exemplary system and apparatus for multipath communication of information according to principles of the invention.

FIG. 2 shows, in schematic functional representation, additional detail regarding a system and method according to principles of the invention. In particular, a multipath communication system 200 includes a transmitter 202 and a receiver 204. Transmitter 202 includes a pre-coder device 206 with a plurality of signal inputs, e.g., 210, 212, 214, 216, 218, 220. The plurality of signal inputs are arranged to receive respective independent information signals 222, 224, 226, 228, 230, 232. One of skill in the art will appreciate that, while individual nodes are illustrated in FIG. 2 for receiving the independent signals, other arrangements, such as receiving a multiplex signal at a single individual node are also intended to be within the scope of this disclosure.

In addition, precoder 206 receives channel state information 234. In the illustrated example embodiment, channel state information is received at a further input node 236. One of skill the art will appreciate, however, that channel state information may be received t a plurality of input nodes, and/or by way of input apparatus that is not dedicated to receiving channel state information.

Transmitter 202 also includes a plurality of transmission devices 238, 240, 242, 244, 246 and 248. In a typical implementation, the transmission devices will include respective carrier frequency generation and modulation apparatus as well as a power amplification device. Accordingly, each of the plurality of transmission devices receives a respective pre-coded signal, e.g., 250, 252 from the pre-coder device 206 and outputs a corresponding modulated carrier signal to a respective transmitting antenna device, e.g., 254, 256, 258. The modulated carrier signals produce respective radiated signals e.g., 260 which traverse an intervening channel region 262 and are coupled to a plurality of receiving antenna devices, e.g., 264, 266, 268, 270, 272, 274.

As will be discussed in additional detail below, and according to principles of the invention, the characteristics of each transmission device and its associated antenna device will, in certain embodiments, be independent of the characteristics of the other transmission devices and antennas of the transmitter 202. The various parameters characterizing each transmitter device e.g. 238 and antenna device e.g. 254 will be available to the pre-coder device 206. Based on these parameters, and on channel information 234, the pre-coder device will produce pre-coded signals 250, 252 that each include a weighted combination of the independent input signals to 22, 224, 226, 228, 230, 232.

It should be noted that the modulated carrier signal broadcast by each transmitting antenna device, e.g. 258, may be received at a plurality of receiving antenna devices 264, 266, 268, 270, 272, 274. In like fashion, each receiving antenna device, e.g. 264, may receive modulated carrier signals produced by all or fewer than all of the transmitting antenna devices, e.g., 254, 256, 258. It should also be noted that the number of transmitting and receiving antenna devices need not be equal. In particular applications of the invention, an excess of transmission antenna devices may transmit to fewer receiving antenna devices. Conversely, an excess of receiving antenna devices may receive signals from fewer transmitting antenna devices.

The receiving antenna devices are respectively coupled to receiving antennas 276, 278, 280, 282, 284 and 286, and include respective devices to receive the incoming signals received from the receiving antennas. The receiving antennas produce corresponding information signals, e.g., 288, 290 which are received at respective inputs, e.g., 294, 296, of decoder device 208. Decoder device 208 responsively produces independent signals 298, 300, 302, 304, 306, 308 having information content that corresponds to input signals 222, 224, 226, 228, 230 and 232 respectively.

Figure 3:
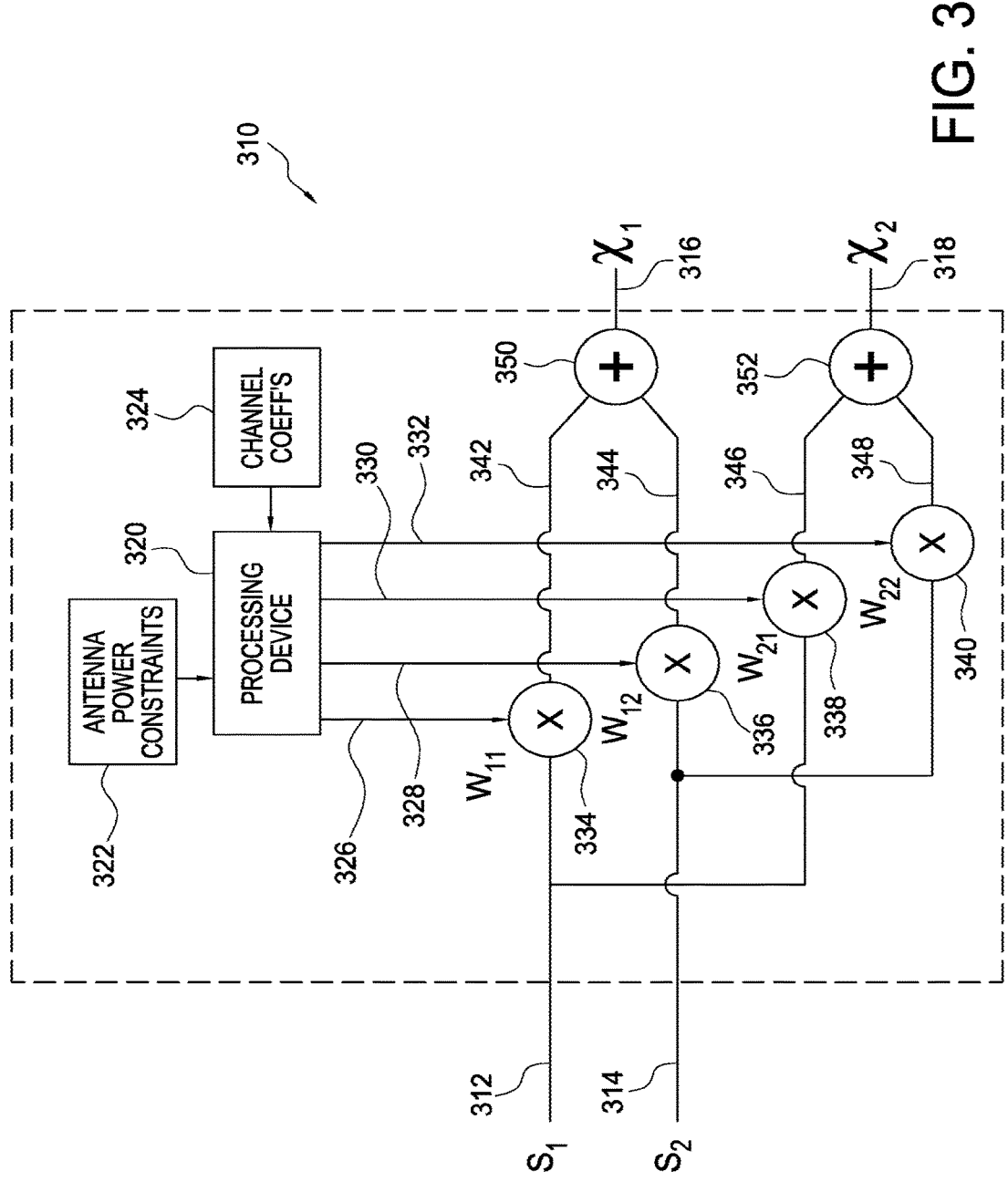
FIG. 3 shows, in schematic block diagram form, additional detail regarding a portion of a system and apparatus for multipath communication of information according to principles of the invention.

FIG. 3 shows, in schematic block diagram form, additional detail as to the construction and operation of a pre-coder device 310 according to principles of the invention. For simplicity, pre-coder device 310 is configured to accept two independent inputs 312, 314 and produce two encoded outputs 316, 318. One of skill in the art will appreciate that, while two inputs and two outputs are discussed here for simplicity of explanation, any number of inputs and outputs will be employed according to the requirements of a particular application.

As illustrated, the pre-coder device 310 includes a processing unit 320 that is arranged to acquire a first signal 322 that represents power constraints associated with the various parameters of transmitter devices and antennas, or other coupling devices, by which the output signal 316, 318, are to be coupled to a multipath communication channel. The processing unit 320 is also arranged to receive a second signal 324 that represents channel coefficients characterizing the state of the multipath communication channel. In response to these inputs, the processing device 320 produces complex signal weighting factors 326, 328, 330, 332 which are received at respective multiplier devices 334, 336, 338, 340.

As indicated, multiplier devices 334 and 338 also receive input signal 312 and multiplier devices 336 and 340 also receive input signal 314. Respective output signals 342, 344, of multiplier devices 334 and 336 are received at an adder device 350. Likewise, respective output signals 346, 348 of multiplier devices 338, 340 are received at adder device 352. Adder device 350 produces precoded signal 316. Adder device 354 produces precoded signal 318. Each of precoded signals 316 and 318 includes weighted linear combinations of the independent input signals 312, 314. This redundancy increases the robustness of transmission over the multipath communication channel.

In addition, precoded signals 316 and 318 embody phase and amplitude information derived from the input antenna power constraints 322 and channel coefficients 324. Consequently, in certain embodiments of the invention, the coupling of signals 316 and 318 to a corresponding multipath transmission channel will result in a radiation pattern including one or more beams to which transmission power and signal composition is dynamically allocated according to the weighting factors 326, 328, 330 and 332. Accordingly, although, in certain applications, transmission power per antenna will be effectively fixed at a maximum average power level, allocation of power per beam will be dynamically variable according to the dynamically changing characteristics of the channel.

One of skill in the art will appreciate that the functional combination of independent input signals 312, 314 with antenna power constraint 322 parameters and channel coefficients 324 will be achieved by a variety of methods and apparatus according to the requirements and constraints of a particular embodiment. Thus, in certain embodiments, processing device 320 will include a Von Neuman style digital processing unit such as a microprocessor or microcontroller.

In other embodiments, processing device 320 will include a dedicated digital logic device implemented, for example, as one or more custom integrated circuits and/or one or more programmable logic arrays. Instill other embodiments, processing device 320 will include an analog processing device and/or a quantum computing device and/or any other appropriate processing device such as is known or may become known in the art.

In addition, while certain embodiments of the invention will effect the calculation and communication of weighting factors 326, 328, 330 and 332 as elements of a complex valued matrix, other embodiments will provide for the calculation and communication of the corresponding information from the processing device in the form of independent phase and amplitude signals, or in any other appropriate fashion. Furthermore, while multiplication and addition functions are shown as discreetly localized devices in FIG. 2, one of skill in the art will appreciate that the corresponding functions will be executed within the processing device on digitized versions of the independent input signals in corresponding embodiments of the invention. It should be understood that all such implementations of the disclosed functionality are considered to be within the scope of the present disclosure.

As noted above, one exemplary method for allocating power, signal composition and data rate to a particular pattern of radiation (i.e., beam pattern) produced by a plurality of antennas involves the calculation and application of a matrix W of complex weighting factors. For expository purposes, exemplary procedures are described herewith for controlling apparatus that effects a desirable communication of information by calculating and applying certain complex weighting factors according to principles of the invention.

Figure 4A:
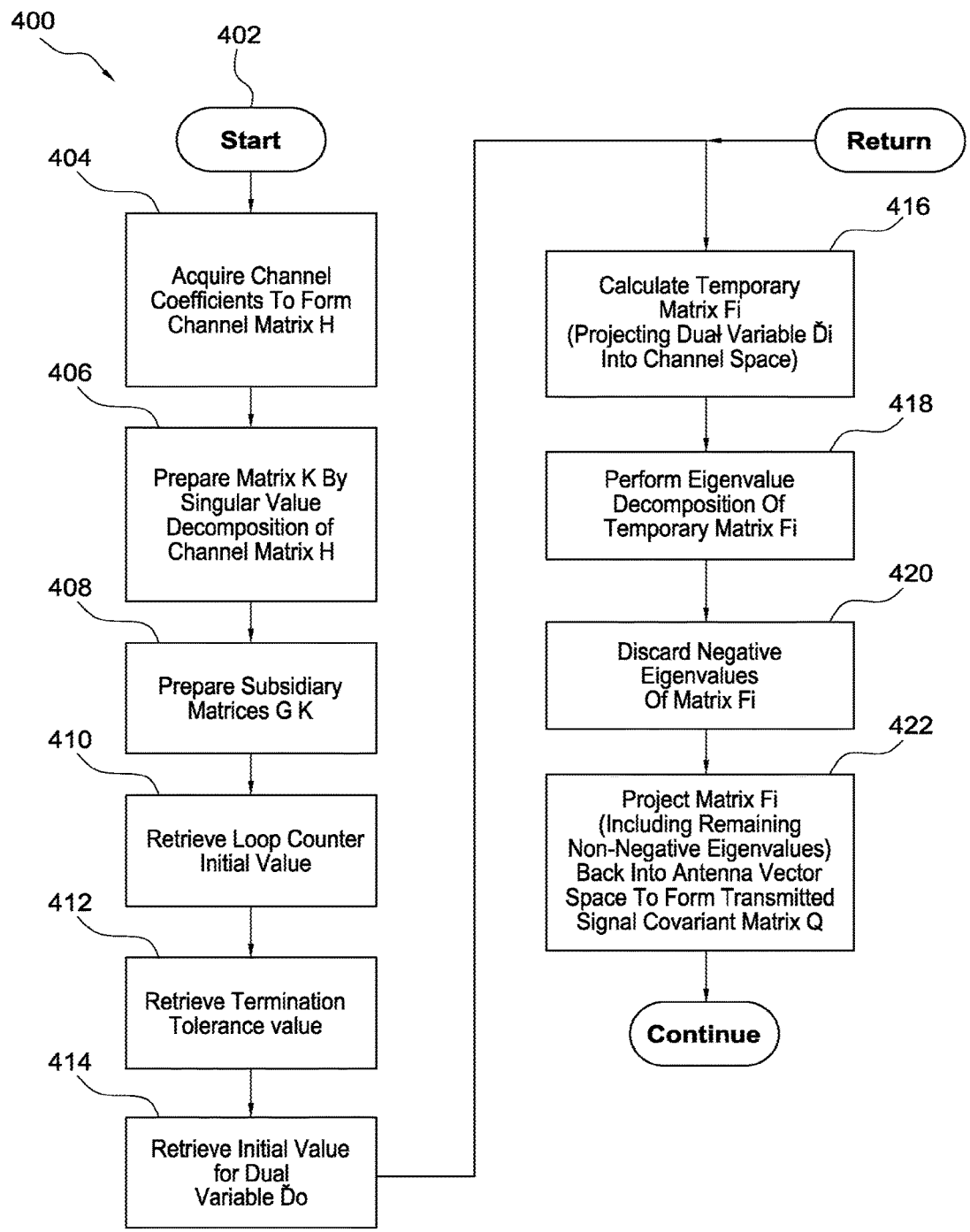
FIG. 4A illustrates, in schematic flow diagram form, a portion of a communication method according to principles of the invention.
Figure 4B:
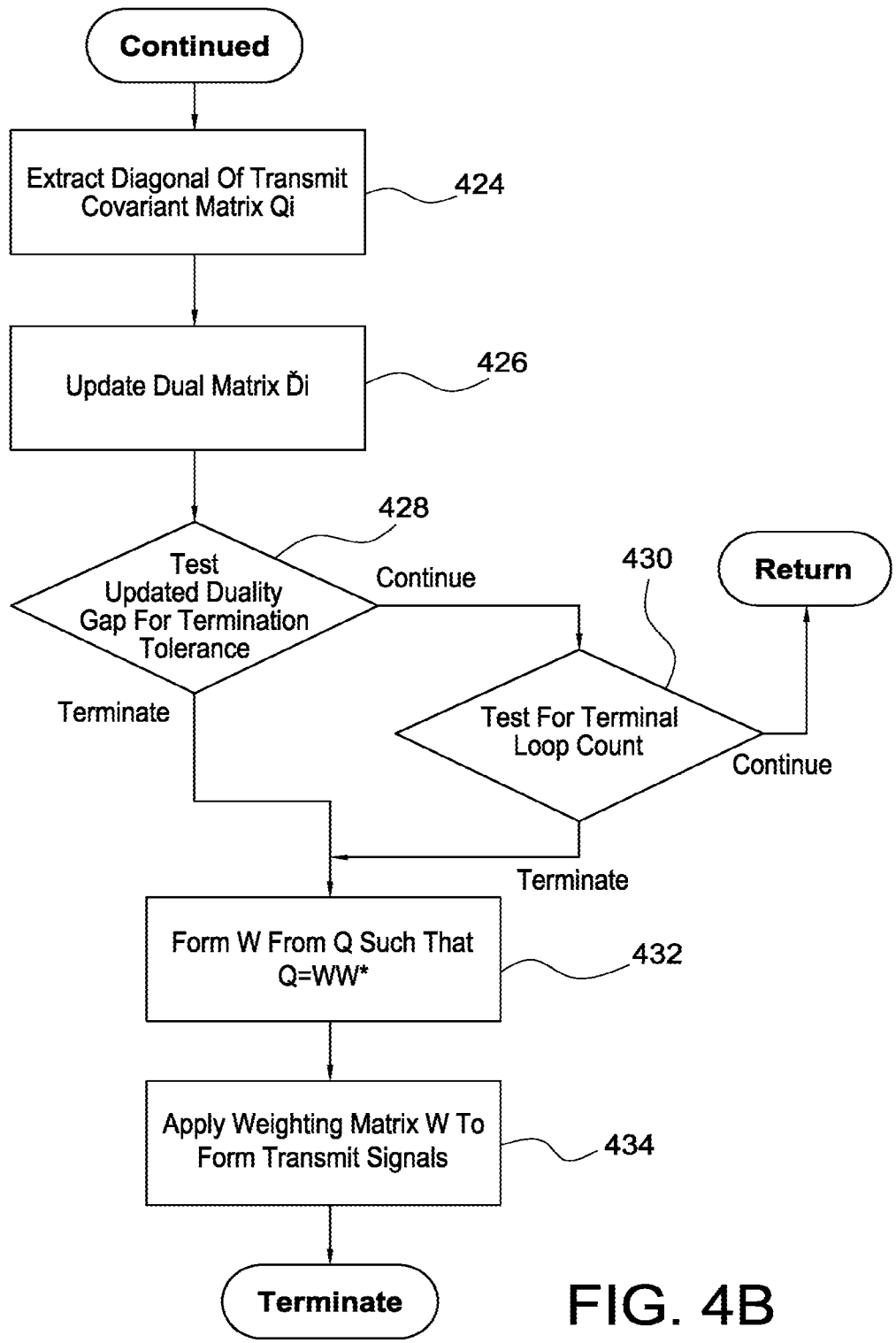
FIG. 4B illustrates, in schematic flow diagram form, another portion of a communication method according to principles of the invention.

FIGS. 4A and 4B visualize, in graphical flowchart form, process steps 400 for producing and applying control parameters for a multipath communication system having a first plurality of transmission antennas and a second plurality of reception antennas where the number of transmission antennas is less than or equal to the number of reception antennas. It should be noted that, while the present example is characterized in terms of radio frequency communications and antennas, as previously noted, the present invention can be applied equally well to a wide variety of other communication systems.

The control parameters are designated here, for convenience, as elements of a complex matrix W, so as to exploit a particular communication channel characterized, according to various measurement techniques, by a matrix H of complex numerical values. It will be understood that, in various applications, the characteristics of the communication channel will be dynamic (i.e., time variable) according to the influence of a wide variety of physical inputs including, for example, atmospheric conditions, interference, fading, motions of transmitting and receiving antennas and of other features of the channel environment. It will be appreciated that process 400 can be executed on a periodic and/or occasional basis depending on the degree to which channel characteristics are anticipated to change, or sensed to be changing.

The illustrated process 400 begins 402 with the characterization of a current state of the physical channel. This characterization includes acquiring channel coefficients to form a channel matrix H 404. It will be understood that channel coefficients are to be represented for operational convenience as complex vectors in a complex vector space. The values of the channel matrix H can be acquired in a wide variety of known, and to be discovered, methods including, for example, the evaluation of a pilot signal and subsequent receipt by the transmitter of a corresponding feedback signal, and/or the evaluation of reciprocal information based on received general information signals.

As a further step in channel characterization, a matrix K is prepared 406 by the singular value decomposition of channel matrix H. Based on matrix K, further subsidiary matrices $\check{G}$ and $\check{K}$ are produced 408, where $\check{K}=K^{-1}$ and $\check{G}=\check{K}\check{K}\dagger$.

The further development of matrix W proceeds by an iterative process. Thus, in further steps, a counter variable i is initialized 410. This counter variable is used to set a maximum number of iterations and, effectively, a maximum calculation time for the preparation of a particular matrix W. A termination tolerance variable ε is also initialized 412. Termination tolerance variable c stops the iterative process once acceptable intermediate values have been achieved, thereby avoiding unnecessary processing cycles.

An initial matrix $\check{D}_0$ is acquired 414. $\check{D}_0$ will have any arbitrary diagonal value $\check{D}_0 \succ 0$. Typically, $\check{D}_0$ will be acquired as a value stored in encoded form in a memory device. Where channel characteristics are known in advance, this value may be selected to minimize the processing cycles necessary. Moreover, in certain embodiments, an optimal value of $\check{D}_0$ calculated in one operation of the process 400 will be stored and recovered as an initial value $\check{D}_0$ for a subsequent operation of the process 400.

Thereafter, a temporary matrix F is calculated 416 for a first iteration of the optimization process. F is calculated as:

$$F_i = K\check{D}_i K\dagger - I_n$$

and thus embodies the number of antennas, the per antenna power constraint, and channel state. One of skill in the art will appreciate that K represents the effective channel seen by a transmitter.

Thereafter, eigenvalue decomposition of temporary matrix F is performed:

$$F_i = U_F \Lambda U_F\dagger$$

Thereafter discard non-positive eigenvalues of matrix $F_i$ 420—first determining the number of non-positive eigenvalues of $F_i$ and thereafter form matrix $S_i$ where $$S_i = -U_F^k \Lambda_F^k U_F^{k\dagger}$$

and where
$\Lambda_F^k$ is the k×k diagonal matrix of all k non-positive eigenvalues of $F_i$ and where
$U_F^k$ consists of the corresponding k eigenvectors One of skill in the art will appreciate that although non-positive eigenvalues of matrix $F_i$ represent directions in which communication could proceed, the efficiency of communication in those directions is insufficient to justify allocation of power according to the corresponding eigenvalues.

Thereafter project the matrix $F_i$ (including remaining non-negative eigenvalues) back into the antenna vector space to form transmitted signal covariant matrix Q ; 422, first forming matrix $Z_i$ where $$Z_i = \check{K} S_i \check{K}_+$$

Thereafter, extract diagonal of covariant matrix $Q_i$ 424

$$Q_i = \check{D}_i - \check{G} + Z_i = \check{K}(F - S_i)\check{K}\dagger$$

Thereafter, update dual variable $\check{D}_i$ 426

$$\check{D}_{i+1} = \check{D}_i - P \cdot \text{diag}(Q_i)$$

Thereafter, evaluate termination tolerance by calculating the duality value Δ 428 where $$\Delta = |tr[\check{D}_i(Q_i-P)]|$$

and comparing Δ to termination tolerance ε. If termination tolerance has been exceeded, proceed to formation of W matrix at step 432. Otherwise, increment loop counter i and test for terminal iteration count. If terminal iteration count has been exceeded, proceed to formation of W matrix at step 432 otherwise proceed with further iteration.

Upon achieving either termination criterion, form W matrix from $Q_i$ at step 432, where, for example, $$Q_i = WW^*$$

$$Q_i = U_Q \Lambda U_{Q^*}$$

$$W = U_Q \Lambda^{1/2}$$

Thereafter, apply elements of matrix W by multiplication with independent input signals as indicated in relation to FIG. 2 above.

Figure 5A:
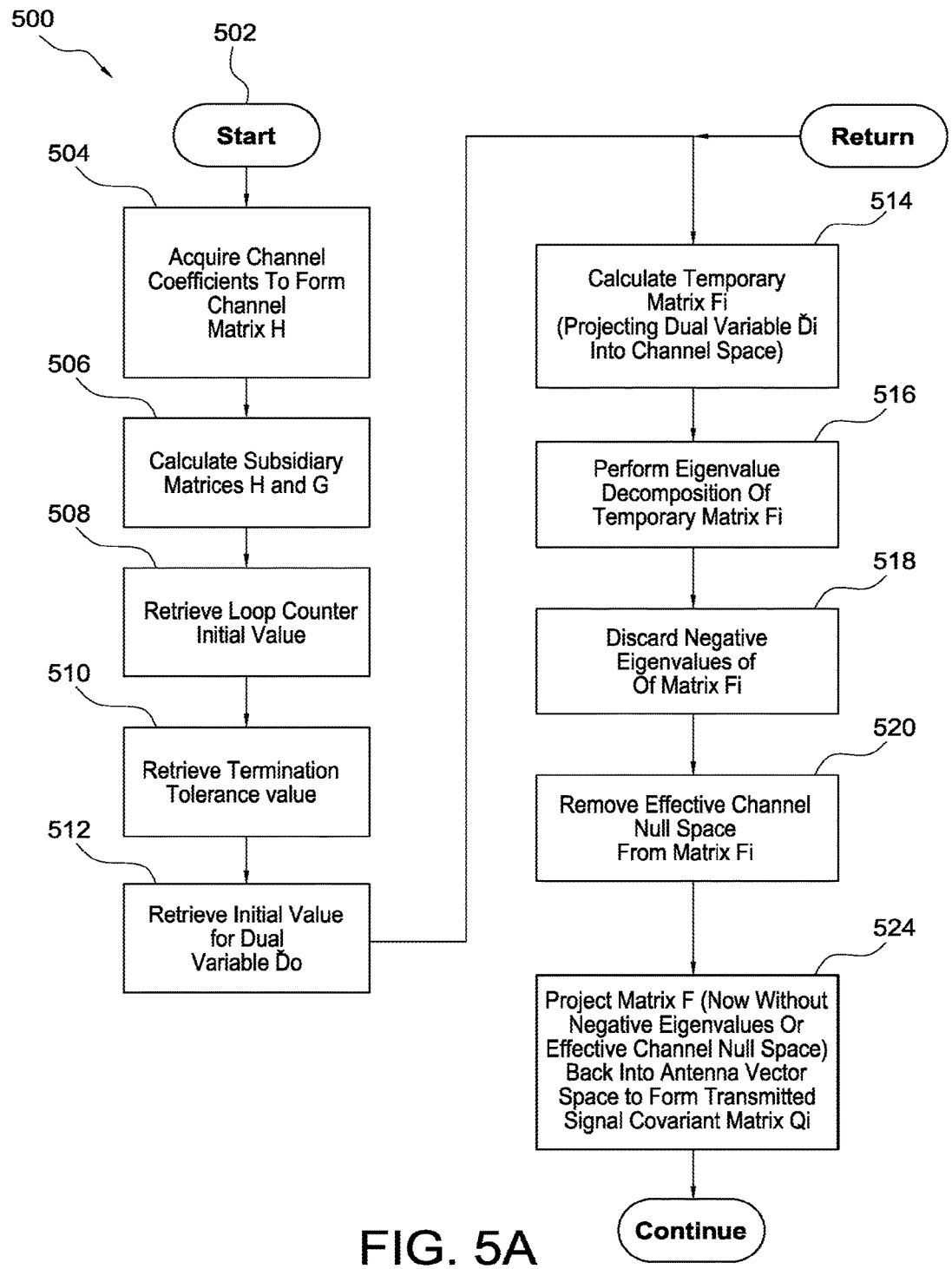
FIG. 5A illustrates, in schematic flow diagram form, a portion of a communication method according to principles of the invention.
Figure 5B:
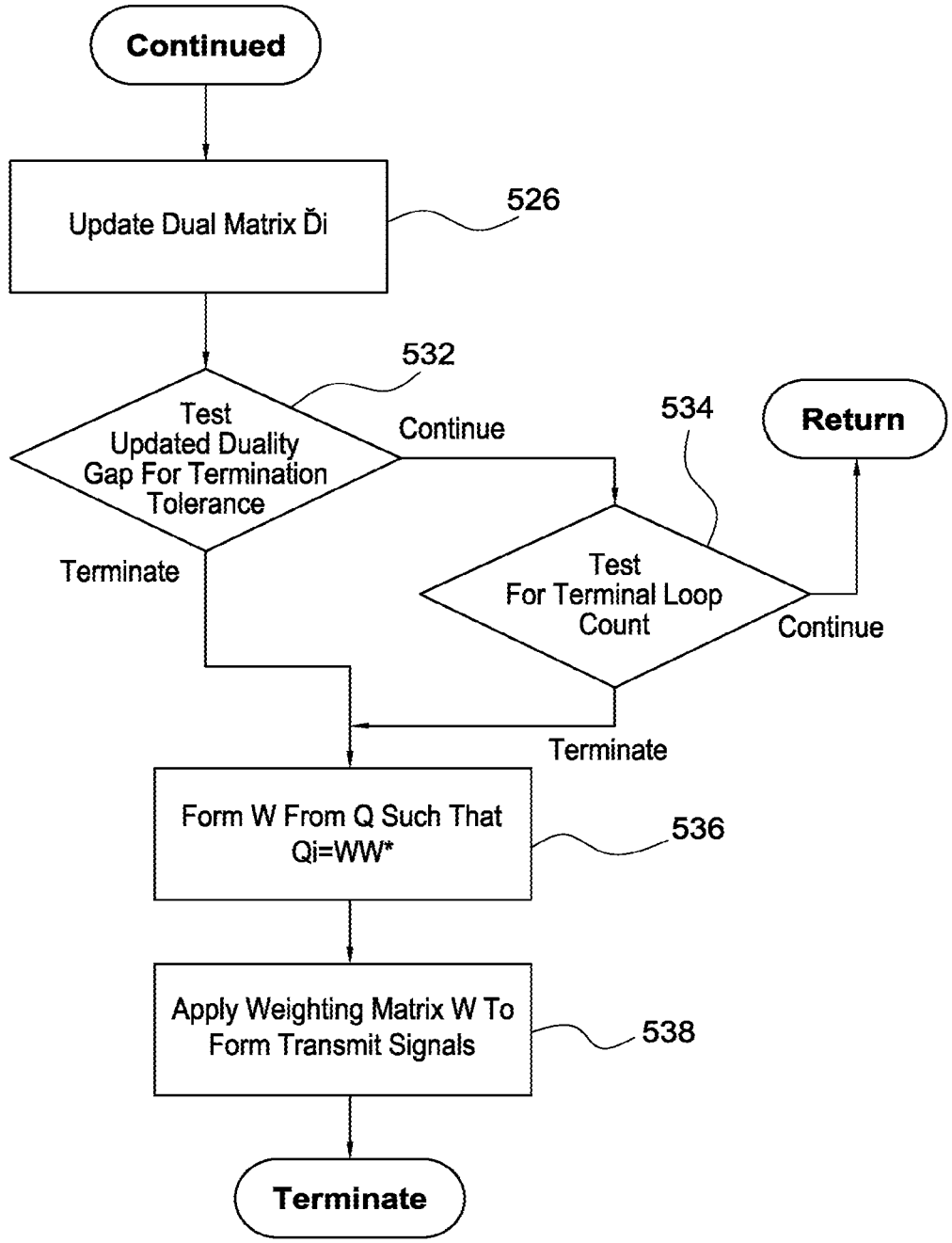
FIG. 5B illustrates, in schematic flow diagram form, another portion of a communication method according to principles of the invention.

FIGS. 5A and 5B visualize, in graphical flowchart form, process steps 500 for producing and applying control parameters for a multipath communication system where the multipath communication system includes a first plurality of transmission antennas and a second plurality of reception antennas, and where the number of transmission antennas is larger than the number of reception antennas. It should again be noted that, while the present example is characterized in terms of radio frequency communications and antennas, as previously noted, the present invention can be applied equally well to a wide variety of other communication systems.

As in the previous example, the control parameters are designated as elements of a complex matrix W, so as to exploit a particular communication channel Again, the channel is characterized, according to various measurement techniques, by a matrix H of complex numerical values. It will be understood that, in various applications, the characteristics of the communication channel will be dynamic (i.e., time variable) according to the influence of a wide variety of physical inputs including, for example, atmospheric conditions, interference, fading, motions of transmitting and receiving antennas and of other features of the channel environment. It will be appreciated that process 500 can be executed on a periodic and/or occasional basis depending on the degree to which channel characteristics are anticipated to change, or sensed to be changing.

The illustrated process 500 begins 502 with the characterization of a current state of the physical channel. This characterization includes acquiring channel coefficients to form a channel matrix H 504 and calculate subsidiary matrices $\check{H}$ and $\check{G}$ 506 where $$\check{H} = V_1 \Sigma_m^{-1} U_H\dagger$$

and $$\check{G} = \check{H}\check{H}\dagger$$

One of skill in the art will appreciate that $\check{H}$ represents the pseudo-inverse of the channel matrix H.

Again, it will be understood that channel coefficients are to be represented for operational convenience as complex vectors in a complex vector space. As discussed above, the values of the channel matrix H can be acquired according to a wide variety of known, and to be discovered, methods including, for example, the evaluation of a pilot signal and subsequent receipt by the transmitter of a corresponding feedback signal, and/or the evaluation of reciprocal information based on received general information signals.

The further development of matrix W proceeds by an iterative process. Thus, in further steps, a counter variable i is initialized 508. This counter variable is used to set a maximum number of iterations and, effectively, a maximum calculation time for the preparation of a particular matrix W. A termination tolerance variable ε is also initialized 510. Termination tolerance variable c stops the iterative process once acceptable intermediate values have been achieved, thereby avoiding unnecessary processing cycles.

An initial matrix $\check{D}_0$ is acquired 512. $\check{D}_0$ will have any arbitrary diagonal value $\check{D}_0 \succ 0$. Typically, $\check{D}_0$ will be acquired as a value stored in encoded form in a memory device. Where channel characteristics are known in advance, this value may be selected to minimize the processing cycles necessary. Moreover, in certain embodiments, an optimal value of $\check{D}_0$ calculated in one operation of the process 500 will be stored and recovered as an initial value $\check{D}_0$ for a subsequent operation of the process 500.

In contrast to the case of abundant receivers, discussed above, in the present abundant transmitters case, a temporary matrix F is calculated directly from channel matrix H 514, rather than from an intermediate matrix K for a first iteration of the optimization process. I.e., F is calculated as:

$$F_i = H\check{D}_i H\dagger - I_m$$

and thus embodies the number of antennas, the per antenna power constraint, and channel state. Note well that, in contrast to process 400 described above, the calculation of $F_i$ in process 500 relies on the channel matrix H directly, and on $I_m$ rather than $I_n$.

Thereafter, eigenvalue decomposition of temporary matrix F is performed 516:

$$F_i = U_F \Lambda U_F\dagger$$

Thereafter discard non-positive eigenvalues of matrix $F_i$ 518—first determining the number of non-positive eigenvalues of $F_i$—and thereafter form matrix $S_i$ where $$S_i = -U_F^k \Lambda_F^k U_F^k\dagger$$

and where $\Lambda_F^k$ is the k×k diagonal matrix of all k non-positive eigenmodes of $F_i$ Thereafter form the matrix $Z_i$, $$Z_i = \check{H} S_i \check{H}^+$$

and, find matrix $D_i$ by inversion $$D_i = \text{diag}\{(D_{ij}^{-1})\}, \text{ where } j=1 \ldots n.$$

Thereafter, form and test matrices B, A and X to ascertain and exclude any modes (beams) that would otherwise be directed into a null-space of the channel, i.e., such that a beam would be directed to a spatial region in which no effective/efficient receiving antenna is available under the per-transmitter power constraint 524.

$$B_i = V_1\dagger(Z_i - G)D_i V_2(V_2\dagger D_i V_2)^{-1}$$

$$A_i = V_1\dagger(I_{n-m} - B_i\dagger V_1\dagger D_i V_2)(V_2\dagger D_i V_2)^{-1}$$

$$X_i = V_2 A_i V_2\dagger + V_1 B_i V_2\dagger - V_2 B_i\dagger V_1\dagger$$

Thereafter form transmitted signal covariant matrix $Q_i$ without non-positive eigenvalues and without channel null space 524, $$Q_i = \check{D}_i - \check{G} + Z_i - X_i\dagger$$

Thereafter, update dual variable $\check{D}_i$ 530

$$\check{D}_{i+1} = \check{D}_i + P - \text{diag}(Q_i)$$

Thereafter, evaluate termination tolerance by calculating the duality value Δ 532 where $$\Delta = |tr[\check{D}_i(Q_i-P)]|$$

and comparing Δ to termination tolerance ε. If termination tolerance has been exceeded, proceed to formation of W matrix at step 536. Otherwise, increment loop counter i and test for terminal iteration count 534. If terminal iteration count has been exceeded, proceed to formation of W matrix at step 536 otherwise proceed with further iteration.

Upon achieving either termination criterion, form W matrix from $Q_i$ where, for example, $$Q_i = WW^*$$

$$Q_i = U_Q \Lambda U_{Q^*}$$

$$W = U_Q \Lambda^{1/2}$$

Thereafter, apply elements of matrix W by multiplication with independent input signals 538 as indicated in relation to FIG. 2 above.

Figure 6:
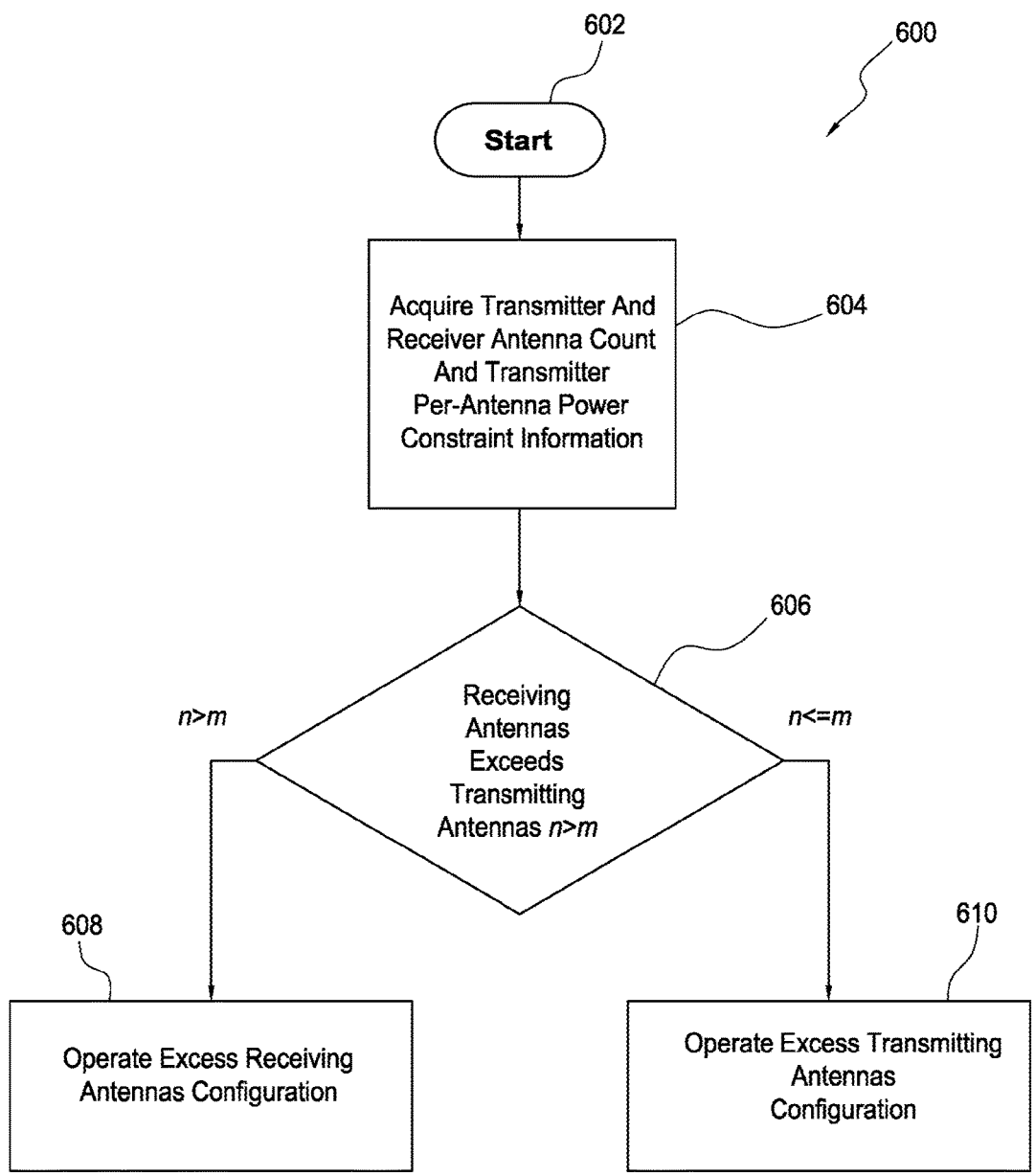
FIG. 6 shows further aspects of a system and method for multipath communication of information according to principles of the invention.

It will be appreciated that one of the advantages of applying a per-antenna power constraint according to the present invention, is the ability to dynamically reconfigure a network, and otherwise respond to a situation in which the number of transmitting and/or receiving antennas is not necessarily known in advance. With this in mind, FIG. 6 shows, in graphical flowchart form, a process 600 for evaluating whether the number of transmitting antennas is more than, or equal to or fewer than, a number of receiving antennas, and responding accordingly. In particular, process 600 described a method for producing and applying control parameters adaptable to a multipath communication system regardless of whether the multipath communication includes more transmission antennas and reception antennas, more reception antennas and transmission antennas, or an equal number of transmission and reception antennas. It will be understood by the reader that this process will be lamented, in various embodiments of the invention, as a system of dedicated hardware components, a configured computer processor system, or any in any other way adapted to achieve the indicated results.

Again, it should again be noted that, while the present example is characterized in terms of communications and antennas, as previously noted, the present invention can also be applied to a wide variety of other communication systems.

Following initiation 602, process 600 includes, acquiring 604 a count of effective transmitter antennas and a receiver antennas, and an acquiring per-antenna power constraint values for each of the transmitter antennas. It will be appreciated that in certain embodiments of the invention, the number of antennas, and there prospective power constraint values, will be changing dynamically as various communication units are added to or dismissed from an ad hoc communications array. Nevertheless, for purposes of the present process, the acquisition of substantially instantaneous values for antenna count and transmitting antenna per-antenna power constraint will allow effective calculation of desirable weighted signals.

On the basis of these acquired values, a determination is made 606 as to whether the existing configuration represents a system in which there is an excess of receiving antennas 608 or not 610. In the event that an excess of receiving antennas is detected available, process 608 is operated to provide substantially the functionality of process 500 discussed above in relation to FIGS. 5A and 5B. Conversely, if no excess of receiving antennas is detected process 610 is operated to provide substantially the functionality of process 400 discussed above in relation to FIGS. 4A and 4B.

In either event, it will be appreciated by the reader that the indicated steps of process 600 will be repeated frequently or infrequently according to the requirements and design parameters of a particular application. This repetition may be repeated on a chronological basis, on the basis of sensing a new configuration of transmitters, on the basis of pilot signal feedback, or reciprocity, or on any other basis appropriate to a particular application.

Additional detail related to the processes provided below, where the process includes acquiring channel coefficients to populate a channel matrix H where the matrix H has dimensions m×n; where m represents the number of receiving coupling devices (eg, receiving antennas) and where n represents the number of transmitting coupling devices (e.g., receiving antennas).

Having populated the channel matrix H with appropriate channel coefficients, a singular value decomposition is then applied to the matrix $$H = U_H \Sigma_H V_H^\dagger$$

where
$U_H$ is an m×m unitary matrix;
$V_H$ is an m×n unitary matrix;
$V_H$ is an m×n diagonal matrix with diagonal entries as real, non-zero singular values $\sigma_{H,i}$ in decreasing order.

The process includes testing whether the number of receiving antennas n exceeds the number of transmitting antennas m.
If so, then:

form a matrix $V_2$ from the last $n-m$ columns of $V_H$ form a matrix $V_1$ from the first $m$ columns of $V_H$ form <. Invert hat . . . >$\Sigma_m = \text{diag}\{\sigma_H^{-1},_i\}$, m×m diagonal matrix form $\check{H} = V_1 \Sigma_m U_H$ form $\check{G} = V_1 \Sigma_m^2 V_1^\dagger$ If, however, the number of receiving antennas n does not exceed the number of transmitting antennas m then:

form $\Sigma_n = \text{diag}\{\sigma_{H,i}\}$, n×n diagonal matrix form $K = V_H \Sigma_n V H \dagger$.

form $\Sigma_n = \text{diag}\{\sigma_H^{-1},_i\}$, n×n diagonal matrix form $K = V_H \Sigma_n V_H^\dagger$ form $\check{G} = V_H \Sigma_n^2 V_H^\dagger$ Having concluded one of the other of the foregoing alternative procedures, thereafter form $P = \text{diag}\{P_i\}$, n×n diagonal matrix.

form $D_0 = P + \text{diag}(G)$.

Thereafter, if the number of receiving antennas n does not exceed the number of transmitting antennas m then:

$(D,Q) = \text{drop-rank-}n(n, D_0, K, K, G, P, \varepsilon)$ otherwise $(D, Q) = \text{drop-rank-}m\ (m, D_0, H, H, G, V_1, V_2, P, \varepsilon)$ Whereupon the return process will return a matrix Q.

Figure 7:
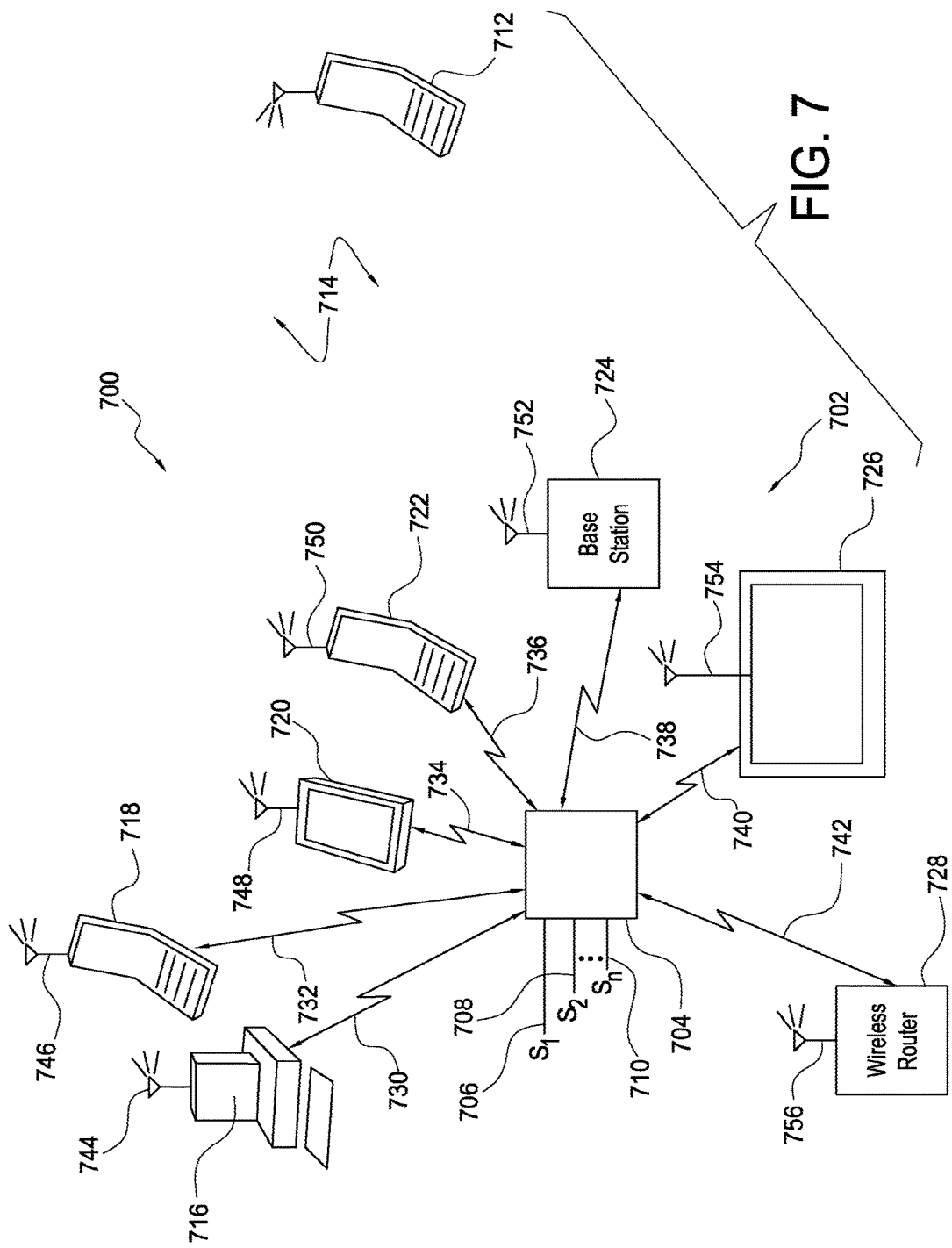
FIG. 7 shows further aspects of a system and method for multipath communication of information, including an ad hoc array according to principles of the invention.

FIG. 7 illustrates, in schematic block diagram form, further aspects of an apparatus, system and method 700 according to principles of the invention. Specifically, FIG. 7 illustrates an exemplary ad hoc antenna array system (here shown as an ad hoc transmitting array system) 702 including transmitter 704 according to principles of the invention. Transmitter 704 is configured to receive one or more exemplary independent signals 706, 708, 710 for transmission to one or more receivers (e.g., 712) through an intervening channel environment 714.

Transmitter 704 is signalingly coupled to a plurality of communication units 716, 718, 720, 722, 724, 726, 728 over respective communication links 730, 732, 734, 736, 738, 740, 742. It will be appreciated that the communication links may be of any form and have any characteristic appropriate to the demands of the signals to be exchanged. Thus, the communication links may include any of a wireless communication link, a wired communication link, and optical communication link, infrared communication link, a microwave communication link, and acoustic communication link, and/or any other appropriate communication link employed alone or in combination.

As illustrated, each of the communication units 716, 718, 720, 722, 724, 726, 728 includes a respective antenna 744, 746, 748, 750, 752, 754, 756. One of skill in the art will appreciate, that while the antennas are illustrated as individual antennas, this is merely for purposes of clarity of presentation. In fact, any one or more of the illustrated antennas will, in certain embodiments, the array of antennas, or any other coupling device such as an optical emitter, an acoustical transducer, and electronic amplifier, or any other device appropriate for coupling the respective communication units to the communication channel in use.

Also, it should be noted that, while in certain embodiments, the communication units will be identical to one another, in other embodiments, and as illustrated here, one or more of the communication units will differ from the others. Indeed, in certain embodiments, all of the communication units will differ from one another in their details are in their general configuration.

Thus, for example (and without in any way intending to be limiting or to represent a comprehensive list) the illustrated communication units include a desktop personal computer 716, a cellular telephone 718, a personal digital assistant 720 such as, for example, an IPAD™ or other tablet device, a further cellular or satellite telephone or walkie-talkie device 722, a broadcasting base station 724 of any configuration, a consumer electronics unit 726 such as, for example, a television set having transmission capabilities, or a wireless router 728 or any other network device having an appropriate transmission capability. Again, it is emphasized that this list of devices is purely exemplary and is in no way comprehensive, but merely represents a range of possible existing and future devices adaptable to the present application.

It will be appreciated that the communication units will communicate with the transmitter 704 over their respective communication links and according to a protocol, such as a standard protocol developed and implemented for the present purposes, to effect an ad hoc array according to principles of the invention. In light of the present illustration, it will be understood that transmitter 704 will receive identification information from a communication unit 716 over communication link 730.

This identification information may include a request to join the ad hoc array, or an offer to join the ad hoc array, and may include a mandatory command to join the ad hoc array.

Thereafter, with further reference to FIGS. 4A-B and the corresponding description above, in certain embodiments of the invention, transmitter 704 will receive antenna count information and power constraint information from communication unit 716. Serially or concurrently, transmitter 704 will receive antenna count information and power constraint information from other communication units in the vicinity (i.e. within its communication link range), so as to form an ad hoc array.

Thereafter, consistent with step 404 of process 400, transmitter 704 will acquire channel coefficients to populate a channel matrix H, from communication unit 716, and from other communication units in the ad hoc array. Transmitter 704 will then prepare matrix K by singular value the composition of channel matrix H consistent with step 406 of process 404. In light of the present disclosure, one of skill in the art will readily understand how the balance of process 404 is executed in a particular embodiment of the invention.

In light of the present disclosure, it will also be apparent to one of skill in the art that the processing functions associated with processes 400, 500, 600, etc. may be entirely conducted within hardware or software located in transmitter 704. In other embodiments, however, among any, or all, of the processing requisite to the present invention may be distributed on an ad hoc basis, or under appropriate any distribution regime, among the various communication units.

Moreover, it will be appreciated that the single receiver 712 illustrated in 7 is merely exemplary of a wide variety of arrangements in which equal numbers, more or fewer receivers will be present as compared with transmitters, and one in which both the transmitters and receivers may be individual devices of any type or configuration, or maybe integrated into respective ad hoc arrays.

Figure 8:
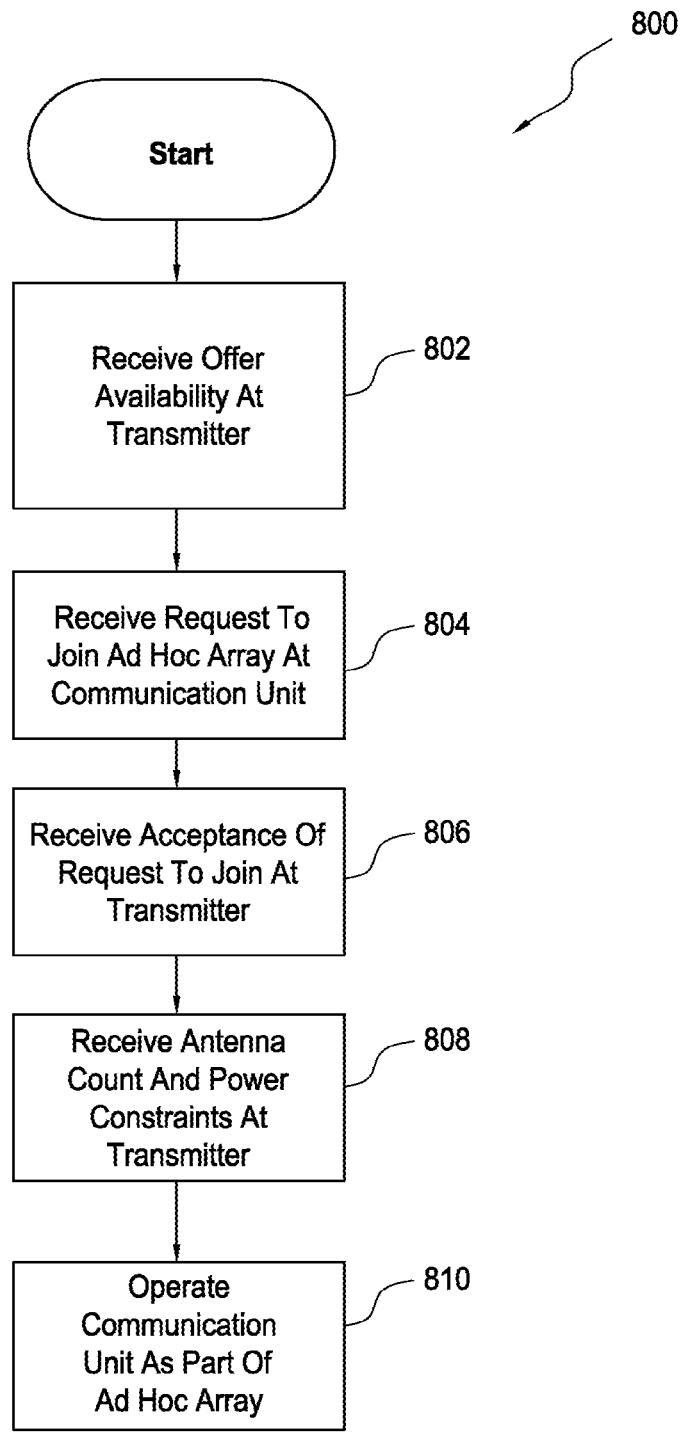
FIG. 8 shows, in flowchart form, further aspects of a system and method for multipath communication of information, including an ad hoc array according to principles of the invention.

In light of the foregoing disclosure, a process as illustrated in flowchart block diagram form in FIG. 8 will include a method for forming an ad hoc communication network 800. In various embodiments, the method will include the steps of receiving an offer of availability 802 from a communications unit at a transmitter; receiving a request to join an ad hoc array at a communication unit from transmitter 804; receiving acceptance of the request to join the ad hoc array at the transmitter from the communication unit 806; receiving antenna count and power constraint information at the transmitter from the communication unit 808; and operating the communication unit as part of the ad hoc array under the control of the transmitter 810.

Figure 9:
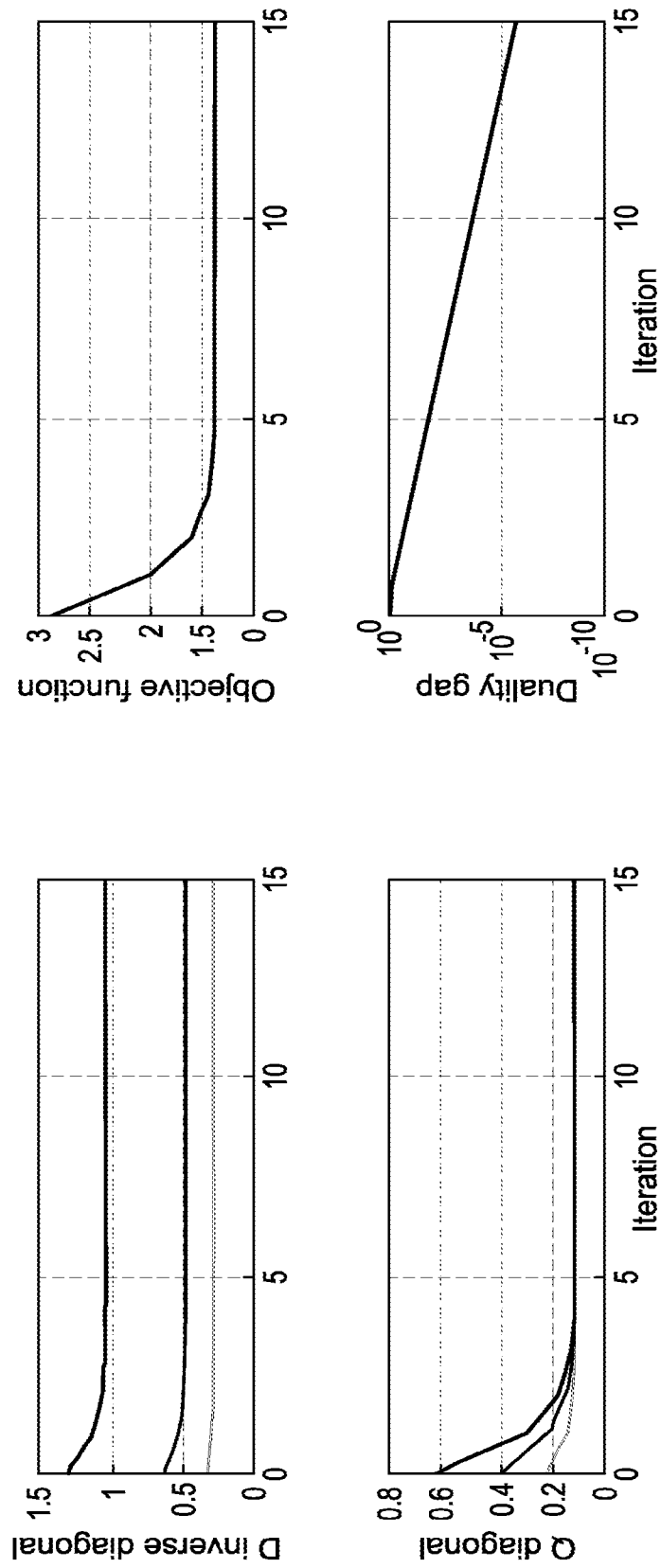
FIGS. 9-13 show, in graphical presentation, simulation results related to experimental simulation of a system and method for multipath communication of information according to principles of the invention.
Figure 10:
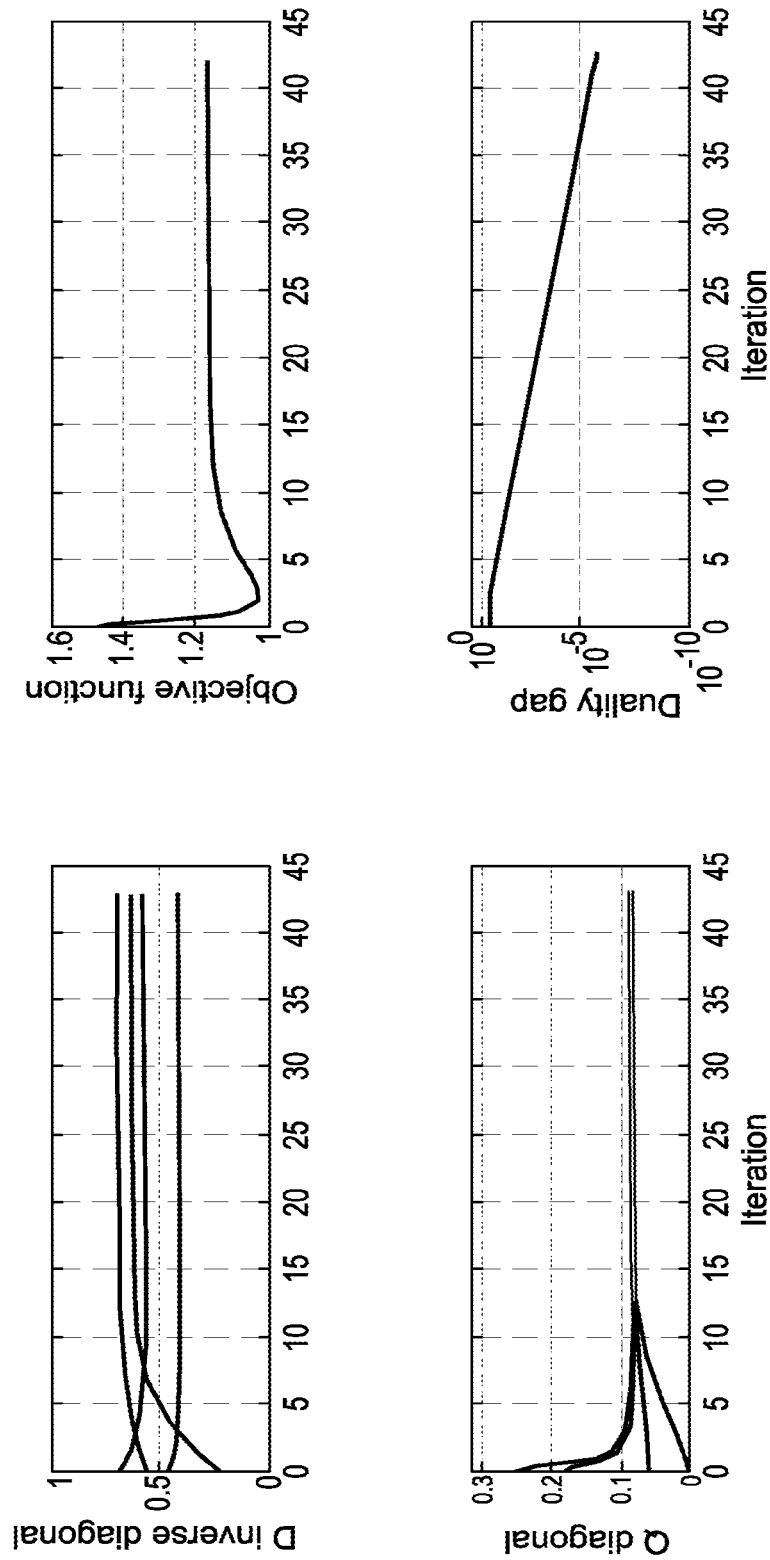
Figure 11:
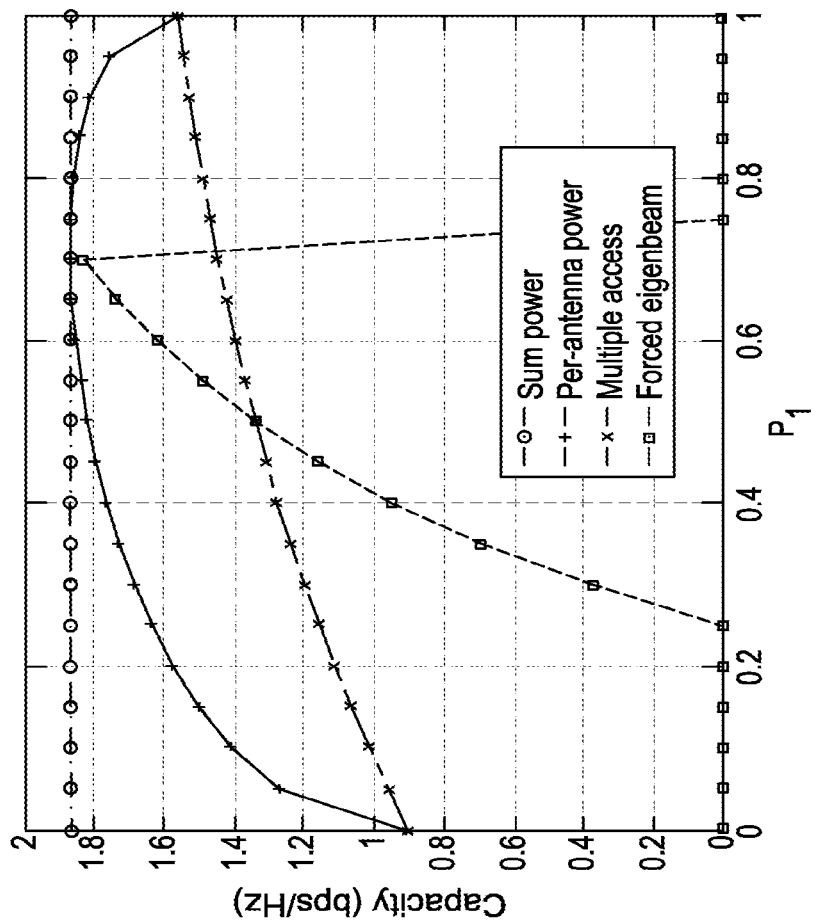
Figure 12:
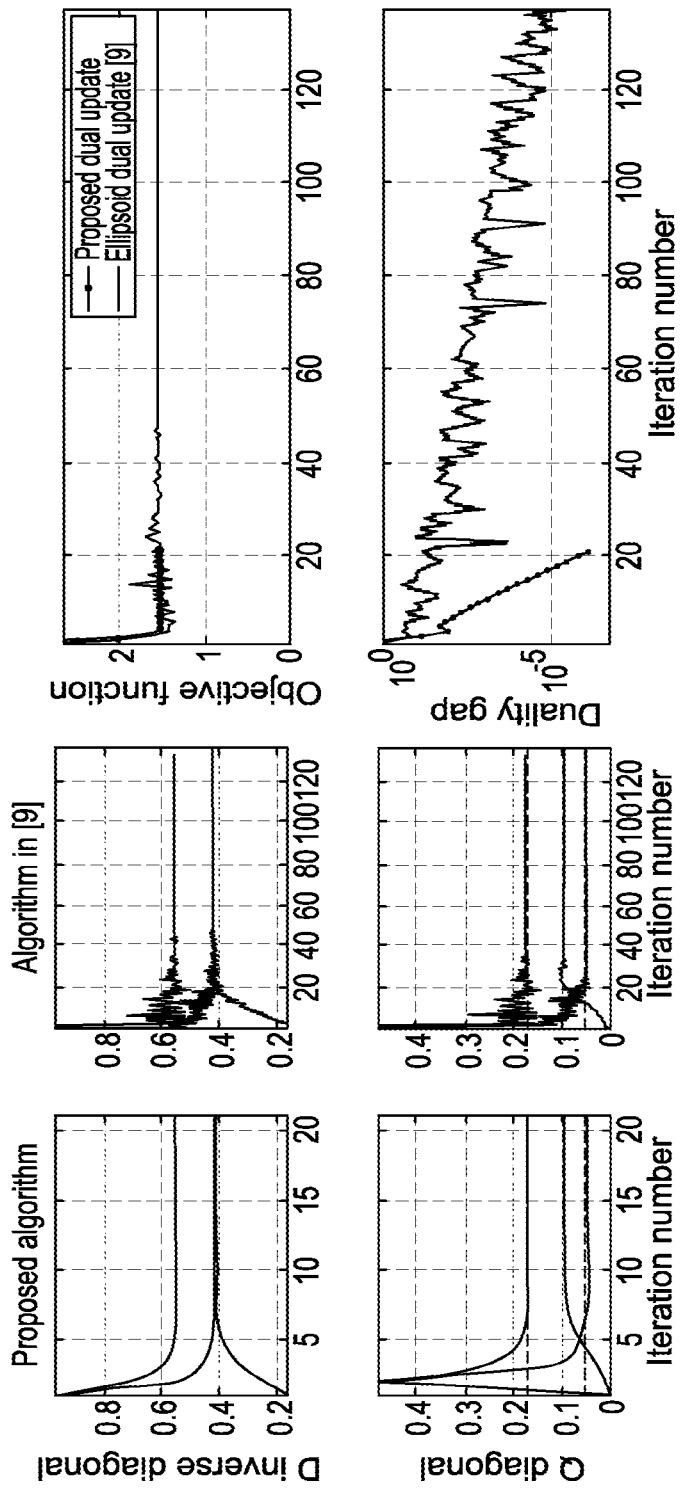
Figure 13:
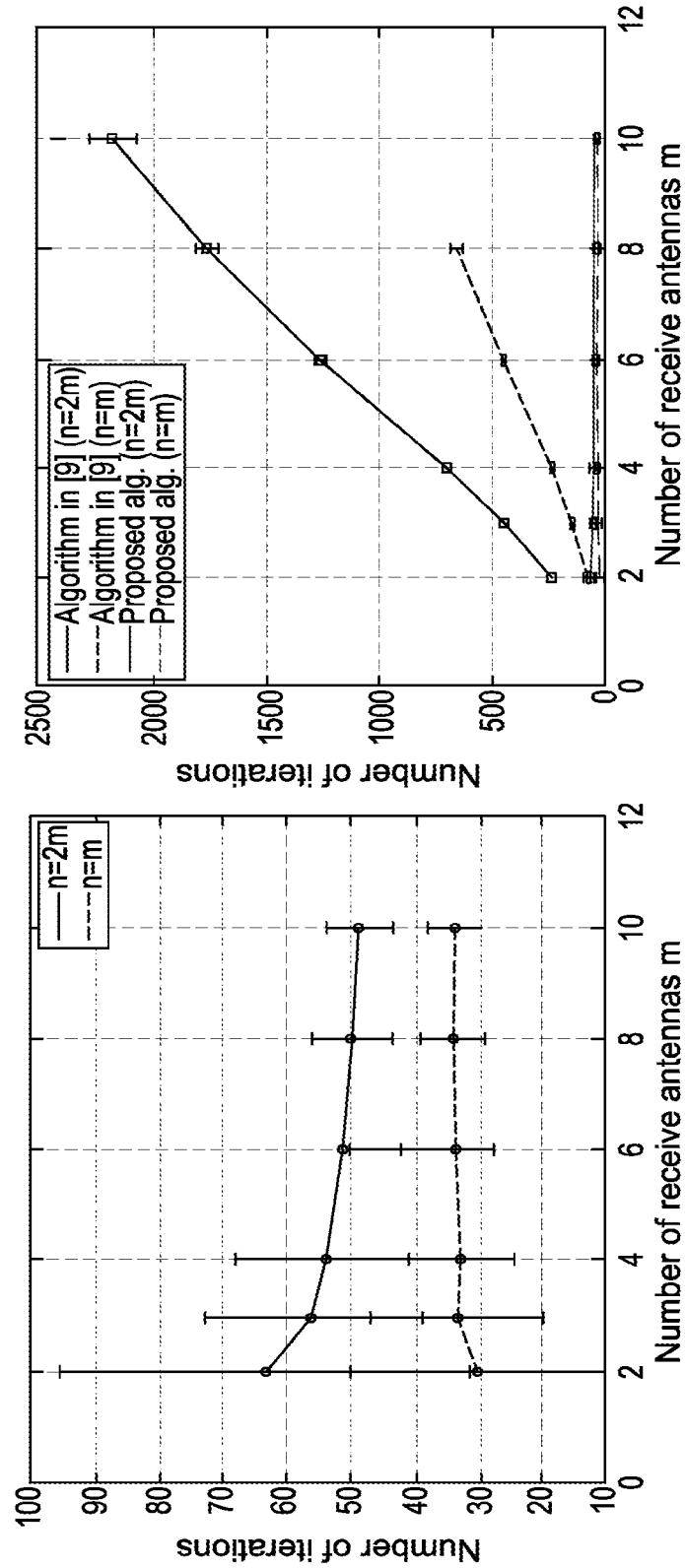
Figure 15:
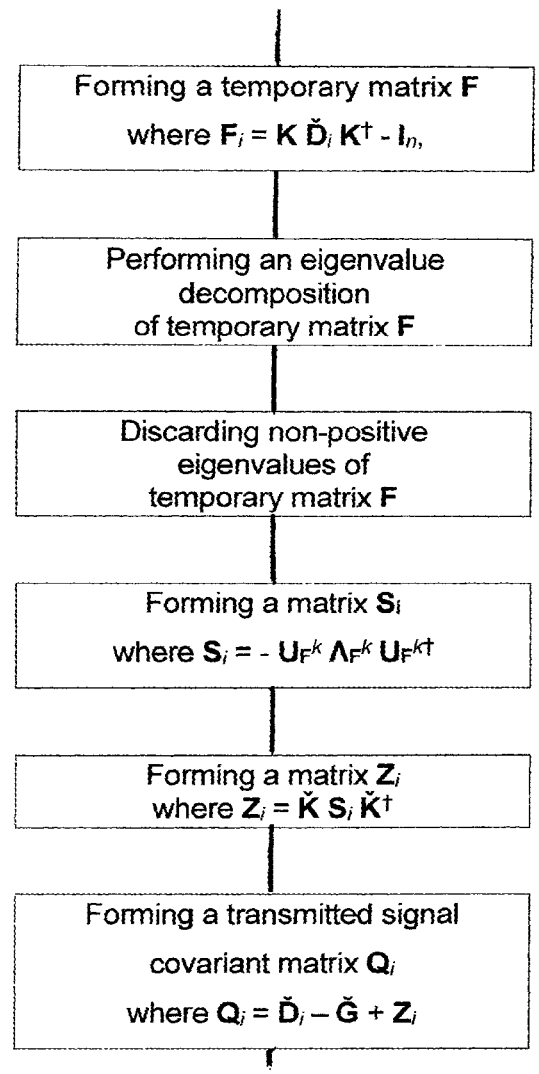
FIG. 15 shows, in flowchart form, iterated steps of a method and process according to principles of the invention.

FIG. 9 shows, in graphical form, a typical convergence for a 3×3 channel at SNR=−5 dB and $\epsilon=10'$. FIG. 10 shows, in graphical form, a typical convergence for a 2×4 channel at SNR=−5 dB, $\epsilon=10'$ and random starting point $\check{D}_0$. FIG. 11 shows, in graphical form, capacities of a 2×2 channel with perfect CSIT at SNR=0 dB withP=diag$\{P_1, 1-P_1\}$. FIG. 12 shows, in graphical form, a convergence comparison for a 3×3 channel at SNR=−5 dB, $\epsilon=10'$ and random starting point $\check{D}_0$ in comparison to a conventional approach. FIG. 13 shows, in graphical form, convergence statistics based on 1000 independent realizations for each channel size, SNR=−5 dB, $\epsilon=10^{-6}$ in comparison to a conventional approach. FIG. 14 shows, in tabular form, a number of non-conversion cases out of 1000) for a conventional approach. Without meaning to be bound to a particular theory of operation, the practitioner of ordinary skill in the art will gain further appreciation of the details of the present invention from the additional disclosure extracted from the beneficially claimed provisional applications and presented in Appendix A of U.S. Pat. No. 9,503,170, which is incorporated herein by reference.

While the exemplary embodiments described above have been chosen primarily from the field of wireless communication, one of skill in the art will appreciate that the principles of the invention are equally well applied, and that the benefits of the present invention are equally well realized, in a wide variety of other communications systems including, for example, wired communications and optical communications including, for example, and DSL communications and any other communication protocol presently known or to be developed in the art, microwave channel communications, infrared spectrum communications, extremely low-frequency (ELF) communications, acoustic communications, among others. Further, while the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:

1. A method comprising: operating a Multi-Input Multi-Output (MIMO) wireless communication system having a precoder device to maximize communication capacity over a channel subject to per-transmitter-element power limits,
  wherein the wireless communication system comprises a first station having a first plurality of (n) transmitter elements and a second station having a second plurality of (m) receiver elements,
  wherein a wireless channel linking the first station and the second station is characterized by channel coefficients (H) from the transmitter elements to the receiver elements, the channel coefficients representing a magnitude and a phase of each channel ($h_{ji}$) from a first transmitter element (i) to a second receiver element (j),
  wherein the per-transmitter-element power limits (P) include, for each transmitter element (i), a respective power limit, and
  wherein the precoder device processes one or more independent inputs ($s_k$) to produce a plurality of (n) transmitter element inputs ($x_i$), the operating of the system comprising:
  determining, based on the channel coefficients (H) and the per-transmitter-element power limits (P), a configuration (W) of the precoder device for accepting the one or more independent inputs ($s_k$) and producing the plurality of (n) transmitter element inputs ($x_i$) satisfying the respective power limits,
  wherein the configuration (W) characterizes a set of beams for emitting from the plurality of transmitting elements, and for each beam of the set of beams, a corresponding transmission power for said beam,
  wherein the configuration (W) corresponds to a relationship (Q) among the transmitter element inputs ($x_i$), the relationship characterizing directions and transmission powers of the set of beams for emitting from the plurality of transmitting elements,
  the determining of the configuration including performing an iterative configuration determining procedure, including
    for at least some iterations (i) of the iterative configuration determining procedure, (a) determining an updated relationship ($Q_i$) characterizing the directions and transmission powers of the set of beams as an explicit function of a quantity ($D_i$) characterizing amounts by which the set of beams of a previous iteration exceeds the per-transmitter-element power limits, and (b) determining an updated quantity ($D_{i+1}$) for use in a subsequent iteration characterizing amounts by which the per-transmitter-element power limits are exceeded by the set of beams characterized by the updated relationship ($Q_i$),
  wherein performing of the iterative configuration determining procedure converges to a configuration that yields an optimal communication capacity of the communication system.

2. The method of claim 1, further comprising:
  communicating via the wireless channel, including processing, using the precoder device configured with the determined configuration (W), the one or more independent inputs ($s_k$) to form the plurality of (n) transmitter element inputs ($x_i$) and transmitting the transmitter element inputs via respective transmitter elements of the first station.

3. The method of claim 1, wherein performing of the iterative configuration determining procedure comprises performing a convex optimization procedure.

4. The method of claim 3, wherein performing the convex optimization procedure includes performing a Semi-Definite Programming (SDP) procedure.

5. The method of claim 1, wherein the relationship (Q) among the transmitter element inputs ($x_i$) comprises a covariance matrix for the transmitter element inputs.

6. The method of claim 5, wherein performing of the iterative configuration determining procedure comprises iteratively updating the covariance (Q).

7. The method of claim 5, wherein iterative updating the covariance includes performing a Primal/Dual optimization procedure.

8. The method of claim 7 wherein performing the Primal/Dual optimization procedure includes updating the covariance (Q) and a dual matrix (D) at each iteration, the dual matrix representing a degree to which the per-transmitter-element power limits (P) are violated.

9. A wireless communication system comprising:
  a first station having a first plurality of (n) transmitter elements configurable to communication with a second station having a second plurality of (m) receiver elements over a wireless channel linking the first station and the second station is characterized by channel coefficients (H) from the transmitter elements to the receiver elements, the channel coefficients representing a magnitude and a phase of each channel ($h_{ji}$) from a first transmitter element (i) to a second receiver element (j), wherein the first station has per-transmitter-element power limits (P) including, for each transmitter element (i), a respective power limit;
  a precoder device coupled to the transmitter elements for processing one or more independent one or more independent inputs ($s_k$) to produce a plurality of (n) transmitter element inputs ($x_i$) to maximize communication capacity over a channel subject to the per-transmitter-element power limits; and
  a controller coupled to the precoder device configured to determine, based on the channel coefficients (H) and the per-transmitter-element power limits (P), a configuration (W) of the precoder device for accepting one or more independent inputs ($s_k$) and produce a plurality of (n) transmitter element inputs ($x_i$) satisfying the respective power limits, wherein the configuration (W) characterizes a set of beams for emitting from the plurality of transmitting elements, and for each beam of the set of beams, a corresponding transmission power for said beam, and each configuration (W) corresponds to a relationship (Q) among the transmitter element inputs ($x_i$), the relationship characterizing directions and transmission powers of the set of beams for emitting from the plurality of transmitting elements, wherein the configuration (W) characterizes a set of beams for emitting from the plurality of transmitting elements, and for each beam of the set of beams, a corresponding transmission power for said beam, and each configuration (W) corresponds to a relationship (Q) among the transmitter element inputs ($x_i$), the relationship characterizing the set of beams for emitting from the plurality of transmitting elements, and also characterizing the corresponding transmission power for each beam, wherein the determining of the configuration includes performing an iterative configuration determining procedure, including for at least some iterations (i) of the iterative configuration determining procedure, (a) determining an updated relationship ($Q_i$) characterizing the directions and transmission powers of the set of beams as an explicit function of a quantity ($D_i$) characterizing amounts by which the set of beams of a previous iteration exceeds the per-transmitter-element power limits, and (b) determining an updated quantity ($D_{i+1}$) for use in a subsequent iteration characterizing amounts by which the per-transmitter-element power limits are exceeded by the set of beams characterized by the updated relationship ($Q_i$).

10. The method of claim 8 wherein performing the Primal/Dual optimization procedure further includes deterministically updating the covariance (Q) as a function of the dual matrix (D) and incrementally updating the dual matrix at each iteration.

* * * * *